US012044624B2

(12) United States Patent
Sun et al.

(10) Patent No.: US 12,044,624 B2
(45) Date of Patent: Jul. 23, 2024

(54) ILLUMINATION FOR FLUORESCENCE IMAGING USING OBJECTIVE LENS

(71) Applicant: Illumina, Inc., San Diego, CA (US)

(72) Inventors: Yinghua Sun, Foster City, CA (US); Stanley S. Hong, Palo Alto, CA (US); Frederick Erie, Carlsbad, CA (US); Alex Nemiroski, San Diego, CA (US); M. Shane Bowen, Encinitas, CA (US); Danilo Condello, San Francisco, CA (US); Dietrich Dehlinger, San Francisco, CA (US); Marco A. Krumbuegel, San Ramon, CA (US); Anthony Lam, Fremont, CA (US); Aaron Liu, Irvine, CA (US); Bojan Obradovic, Carlsbad, CA (US); Mark Pratt, Belmont, CA (US)

(73) Assignee: Illumina, Inc., San Diego, CA (US)

( * ) Notice: Subject to any disclaimer, the term of this patent is extended or adjusted under 35 U.S.C. 154(b) by 151 days.

(21) Appl. No.: 17/663,476

(22) Filed: May 16, 2022

(65) Prior Publication Data

US 2022/0276169 A1 Sep. 1, 2022

Related U.S. Application Data

(62) Division of application No. 16/351,193, filed on Mar. 12, 2019, now Pat. No. 11,360,027.
(Continued)

(51) Int. Cl.
*G01N 21/64* (2006.01)

(52) U.S. Cl.
CPC ..... *G01N 21/6456* (2013.01); *G01N 21/6428* (2013.01); *G01N 2021/6439* (2013.01);
(Continued)

(58) Field of Classification Search
CPC .......... G01N 21/6428; G01N 21/6456; G01N 2021/6439; G01N 2021/6463; G01N 2021/6482
See application file for complete search history.

(56) References Cited

U.S. PATENT DOCUMENTS

| 4,775,637 A | 10/1988 | Sutherland et al. |
| 5,381,224 A | 1/1995 | Dixon et al. |

(Continued)

FOREIGN PATENT DOCUMENTS

| CN | 1149336 | 5/1997 |
| CN | 101487794 | 7/2009 |

(Continued)

OTHER PUBLICATIONS

Duveneck, et al., "Planar waveguides for ultra-high sensitivity of the analysis of nucleic acids", Analytica chimica acta vol. 469 No. 1, 2002, 49-61.
(Continued)

*Primary Examiner* — Kevin K Pyo
(74) *Attorney, Agent, or Firm* — Brake Hughes Bellermann LLP

(57) ABSTRACT

A system includes: an objective lens; a first light source to feed first illuminating light through the objective lens and into a flowcell (e.g., with a relatively thin film waveguide) to be installed in the system, the first illuminating light to be fed using a first grating on the flowcell; and a first image sensor to capture imaging light using the objective lens, wherein the first grating is positioned outside a field of view of the first image sensor. Dual-surface imaging can be performed. Flowcells with multiple swaths bounded by gratings can be used. An auto-alignment process can be performed.

20 Claims, 16 Drawing Sheets

Related U.S. Application Data

(60) Provisional application No. 62/649,996, filed on Mar. 29, 2018.

(52) U.S. Cl.
CPC ............. *G01N 2021/6463* (2013.01); *G01N 2021/6482* (2013.01)

(56) References Cited

U.S. PATENT DOCUMENTS

| | | | |
|---|---|---|---|
| 6,078,705 | A | 6/2000 | Neuschaefer et al. |
| 6,211,954 | B1 | 4/2001 | Danielzik et al. |
| 6,545,759 | B1 | 4/2003 | Hartman |
| 6,652,810 | B1 | 11/2003 | Ziegler |
| 7,154,598 | B2 | 12/2006 | Montagu et al. |
| 7,218,446 | B2 | 5/2007 | Dixon et al. |
| 7,476,503 | B2 | 1/2009 | Turner et al. |
| 7,537,734 | B2 * | 5/2009 | Reichert ............ G01N 21/7703 422/82.11 |
| 7,901,630 | B2 | 3/2011 | Putnam et al. |
| 8,241,573 | B2 | 8/2012 | Banerjee et al. |
| 9,075,017 | B2 * | 7/2015 | Kasai ................. G01N 21/552 |
| 9,404,737 | B2 | 8/2016 | Segale et al. |
| 2004/0038386 | A1 | 2/2004 | Zesch et al. |
| 2008/0161194 | A1 | 7/2008 | Turner et al. |
| 2009/0109441 | A1 | 4/2009 | Hartman |
| 2009/0187350 | A1 | 7/2009 | Chau et al. |
| 2009/0247414 | A1 | 10/2009 | Obradovic et al. |
| 2014/0105789 | A1 | 4/2014 | Kasai et al. |
| 2015/0308958 | A1 | 10/2015 | Lemieux et al. |
| 2016/0238447 | A1 | 8/2016 | Cho et al. |
| 2016/0273034 | A1 | 9/2016 | Lundquist et al. |

FOREIGN PATENT DOCUMENTS

| | | |
|---|---|---|
| CN | 105378463 | 3/2016 |
| CN | 107850537 | 3/2018 |
| WO | 1995/033198 | 12/1995 |
| WO | 2001/040744 | 6/2001 |
| WO | 2010/062627 | 6/2010 |
| WO | 2015/004264 | 1/2015 |
| WO | 2015/030678 A1 | 3/2015 |
| WO | 2017/001609 | 1/2017 |
| WO | 2019190740 A1 | 10/2019 |

OTHER PUBLICATIONS

Eisen, Michael B., et al., "DNA Arrays for Analysis fo Gene Expression", Methods in Enzymology, vol. 303, p. 179-205, 1999.

Examination Report for Australian Patent Application No. 2019242031, mailed on Apr. 28, 2021, 8 pages.

https://www.biooopticsworld.coom/articles/print/volume-8/issue-1/features/genetics-dna-sequencing-laser-fluorescence-powers-sequencing-advances.html, Jan. 21, 2015, 13 pages.

Agnarsson, et al., "Evanescent-Wave Fluorescence Microscopy Using Symmetric Planar Waveguides", Optics Express, vol. 17, No. 7;, Mar. 30, 2009, pp. 5075-5082.

Lee, S., et al., "Dual-color prism-type TIRFM system for direct detection of single-biomolecules on nanoarray biochips", Current Applied Physics, vol. 8 (6), 2008, 700-705.

* cited by examiner

ILLUMINATION FOR FLUORESCENCE IMAGING USING OBJECTIVE LENS

CROSS-REFERENCE TO RELATED APPLICATION

This application is a divisional application of U.S. application Ser. No. 16/351,193, filed Mar. 12, 2019, which is a non-provisional application of, and claims the benefit of the filing date of, U.S. provisional application 62/649,996, filed Mar. 29, 2018, the contents of both of which applications are incorporated herein by reference.

BACKGROUND

High-throughput DNA sequencing can be the basis for genomic analysis and other genetic research. In this and other types of sequencing, characteristics of a sample of genetic material are determined by illuminating the sample, for example using a planar waveguide. Some types of image detection can place particular demands on the sequencing system in order to create an image of the entire sample. For example, with a time-delay and integration (TDI) sensor the image is captured one narrow sliver at a time, involving a scanning operation along the length of the slide. To reduce photodamage to the sample from the illuminating light, it is often desirable to confine the illumination to the sample area being imaged. In some instances, this creates the challenge of ensuring that the illumination is synchronized with the image detection throughout the scanning process.

SUMMARY

In a first aspect, a system includes: an objective lens; a first light source to feed first illuminating light through the objective lens and into a flowcell to be installed in the system, the first illuminating light to be fed using a first grating on the flowcell; and a first image sensor to capture imaging light using the objective lens, wherein the first grating is positioned outside a field of view of the first image sensor.

Implementations can include any or all of the following features. The flowcell is installed in the system. The first grating and a second grating are positioned on the flowcell. The first and second gratings have different coupling angles. The first and second gratings have different grating periods. The flowcell includes a first sample surface parallel to a second sample surface, the first grating to couple a first portion of the first illuminating light to illuminate the first sample surface, and the second grating to couple a second portion of the first illuminating light to illuminate the second sample surface. The system further comprises a first planar waveguide into which the first grating couples the first portion of the first illuminating light, and a second planar waveguide into which the second grating couples the second portion of the first illuminating light. The first grating is offset, relative to the second grating, in a travel direction of the first portion of the first illuminating light. The first and second gratings are positioned on opposite sides of a planar waveguide that illuminates the flowcell, the first grating coupling the first illuminating light into the planar waveguide, and the second grating coupling the first illuminating light out of the planar waveguide. The system further comprises a wall that blocks the first illuminating light coupled out of the planar waveguide by the second grating from entering the objective lens. The first illuminating light comprises a first light beam of a first wavelength, the system further comprising a second light source to feed second illuminating light through the objective lens, the second illuminating light comprising a second light beam of a second wavelength. The second light source is to feed the second illuminating light through the objective lens into the flowcell via the first grating, the first grating having a symmetric coupling angle for the first and second wavelengths. The first light source is directing the first light beam at a first side of the objective lens, and the second light source directing the second light beam at a second side of the objective lens opposite the first side. The system further comprises a first mirror and a tube lens positioned after the first and second light sources and before the objective lens, wherein respective angles of the first and second light beams in propagation from the first mirror to the tube lens reflect corresponding incident angles of the first and second light beams on the first grating. The system further comprises a second mirror positioned after the first light source and before the first mirror, the second mirror to provide a spatial separation of the first and second light beams on the first grating. The flowcell has multiple swaths bounded by respective gratings including the first grating, and wherein the system uses at least one of the respective gratings both as an entry grating and an exit grating. A waveguide material of the flowcell includes $Ta_2O_5$. The first image sensor comprises a time delay and integration sensor, the system further comprising a moveable stage holding the flowcell. The system further comprises a thermal stage to hold the flowcell, the thermal stage providing thermal control. The system further comprises a second image sensor that captures images of at least the first grating and a planar waveguide in the flowcell, wherein the system evaluates the images using an alignment criterion. The light has a wavelength to trigger a fluorescent response from a sample in the flowcell.

In a second aspect, a flowcell includes: a substrate to hold a sample; a first planar waveguide to lead first light for the sample; a first grating to couple the first light; a second planar waveguide to lead second light for the sample; and a second grating to couple the second light.

Implementations can include any or all of the following features. The first grating is positioned on the first planar waveguide, and the second grating is positioned on the second planar waveguide. The first and second gratings have different coupling angles. The first and second gratings have different grating periods. The flowcell includes a first sample surface parallel to a second sample surface, the first grating to couple the first light to illuminate the first sample surface, and the second grating to couple the second light to illuminate the second sample surface. The first grating is offset, relative to the second grating, in a travel direction of the first light. The first grating to couple the first light into the first waveguide, the second grating to couple the second light into the second waveguide, the flowcell further comprising a third grating to couple the first light out of the first planar waveguide, and a fourth grating to couple the second light out of the second planar waveguide.

In a third aspect, a method includes: feeding illuminating light through an objective lens and into a flowcell using a first grating positioned outside an image-sensor field of view; and capturing imaging light using the objective lens.

Implementations can include any or all of the following features. The flowcell includes a first sample surface parallel to a second sample surface, the method further comprising directing a first component of the illuminating light to a first grating aligned with the first sample surface, and directing a second component of the illuminating light to a second grating aligned with the second sample surface. The method further comprises adjusting the objective lens to focus on the first sample surface in connection with directing the first component of the illuminating light to the first grating, and adjusting the objective lens to focus on the second sample surface in connection with directing the second component of the illuminating light to the second grating. The illuminating light comprises a first light beam of a first wavelength, and a second light beam of a second wavelength, the method further comprising directing the first light beam at a first side of the objective lens, and directing the second light beam at a second side of the objective lens opposite the first side. The method further comprises blocking the illuminating light, upon the illuminating light exiting the flowcell, from entering the objective lens. A thermal stage holds the flowcell, the method further comprising providing thermal control of the flowcell using the flowcell. The flowcell has multiple swaths bounded by respective gratings including the first grating, the method further comprising using at least one of the respective gratings both as an entry grating and an exit grating. The method further comprises performing an alignment process that evaluates a quality of coupling by the first grating.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

DETAILED DESCRIPTION

Figure 1:
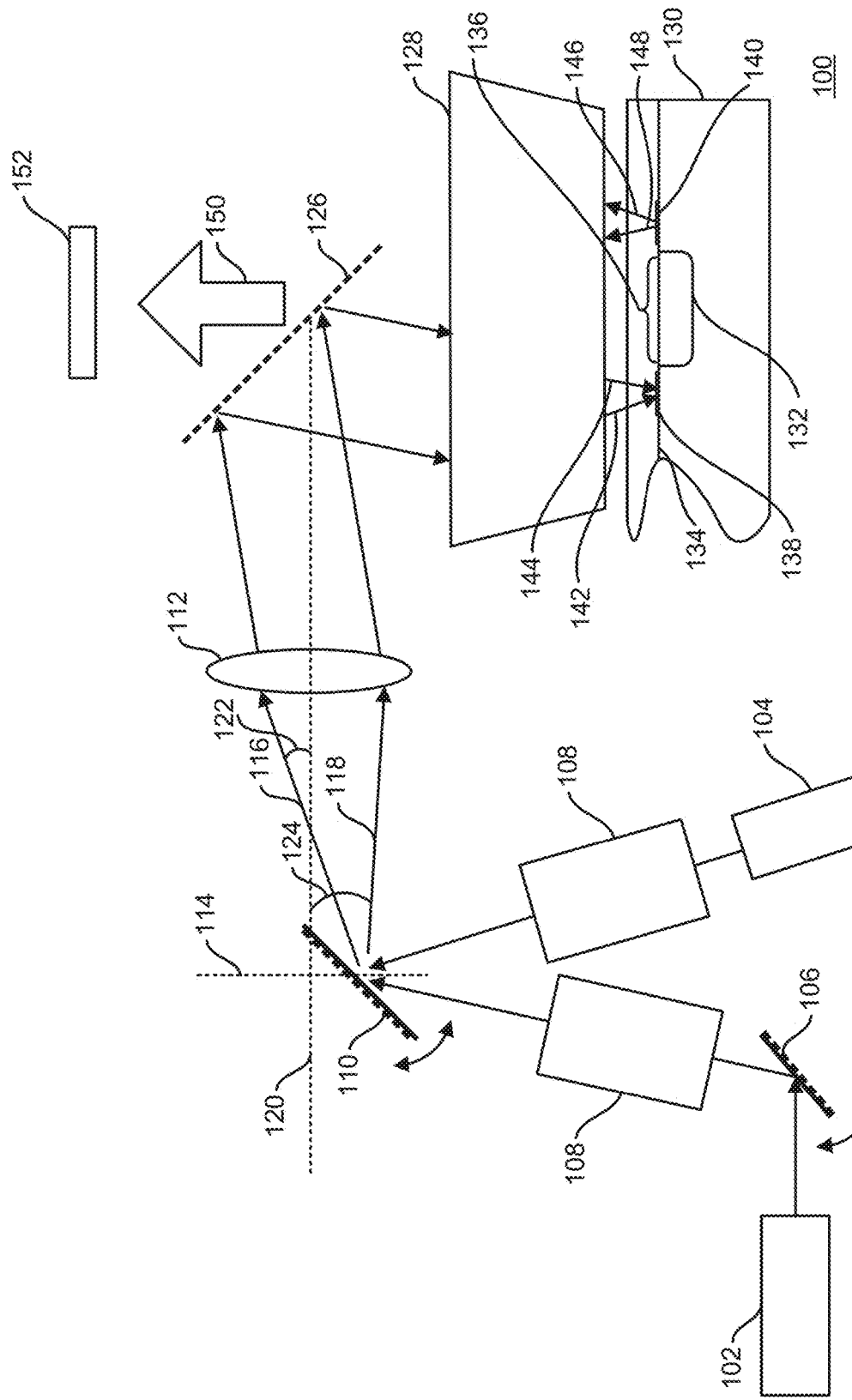
FIG. 1 shows an example of an optical layout for planar waveguide illumination.

This document describes examples of illumination for fluorescent imaging using an objective lens. In some implementations, an optical architecture can facilitate low-power, low-background, illumination for high-speed scan imaging. This can involve synchronizing the illumination with the detection through the microscope objective lens. At a signal-to-noise ratio (SNR) equivalent to that of traditional planar waveguide illumination, a laser power reduction of up to about 70 times can be obtained using such an approach.

In some implementations, laser beams can travel through the objective lens so as to synchronize the imaging optics and the illumination with each other. The waveguide and one or more gratings can be designed with coupling angles needed by the numerical aperture of the objective lens, and by the wavelength of the laser. Laser beam shaping optics can be used to define proper beam dimensions and the quality of light to assure coupling efficiency and tolerance. A proper waveguide, grating, cladding and/or substrate material can be selected to be compatible with the sequencing chemistry and the runs being performed. A proper geometry and optical performance for fluorophore excitation with low background can be designed. In some implementations, dual-surface imaging can be supported. In some implementations, multiple-color excitation (e.g., dual-color) can be supported.

Delivering illuminating light such as one or more laser beams through the imaging objective lens can provide advantages over existing approaches. For example, providing the laser beam through the objective lens means that illumination and image capture are performed on the same side of the flowcell. The backside of the flowcell then can be used for facilitating one or more other aspects of the process, such as accurate or rapid temperature control of the sample. Fine control of the illumination laser beam with regard to size, angle and position can be provided. This can increase the alignment tolerance on the grating, which in turn can significantly reduce the cost of optomechanics and grating fabrication. High-speed scanning can be facilitated by co-registration of an illumination line with the detection apparatus (e.g., a TDI sensor). Optics can be designed to shape the laser beam as a narrow line formed inside a planar waveguide. For example, the planar waveguide can have a thickness range of about 50-200 nanometers (nm) or larger. As such, the planar waveguide can be considered a relatively thin film waveguide. A planar waveguide can provide a high power density with a relatively low amount of laser power. Materials compatible with the surface and the sequencing chemistry (including, but not limited to, $Ta_2O_5$ or SiN) can be used. In some implementations, $Ta_2O_5$ can be used as a core, $SiO_2$ can be used as a substrate, and a water buffer or a polymer layer can be used as cladding. For example, the cladding can have a refractive index of about 1.3-1.5. Grating couplers can be designed to have different acceptance angles for different wavelengths. For example, red and green laser lights can be used. As another example, grating couplers can be designed on different surfaces (e.g., top and bottom surfaces) of the flowcell.

Examples described herein relate to sequencing of genetic material. Sequencing can be performed on a sample to determine which building blocks, called nucleotides, make up the particular genetic material that is in the sample. The sequencing can be done after the genetic material has first been purified and then replicated a number of times so as to prepare a sample of a suitable size.

Imaging can be performed as part of the process of sequencing the genetic material. This can involve fluorescent imaging, where a sample of genetic material is subjected to light (e.g., a laser beam) to trigger a fluorescent response by one or more markers on the genetic material. Some nucleotides of the genetic material can have fluorescent tags applied to them, which allows for determination of the presence of the nucleotide by shining light onto, and looking for a characteristic response from, the sample. Fluorescent responses can be detected over the course of the sequencing process and used to build a record of nucleotides in the sample.

Examples described herein refer to flowcells. A flowcell is a substrate that can be used in preparing and carrying one or more samples in at least one stage of a sequencing process. The flowcell is made of a material that is compatible with both the illumination and the chemical reactions to which it will be exposed. The substrate can have one or more channels in which sample material can be deposited. A substance (e.g., a liquid) can be flowed through the channel where the sample genetic material is present to trigger one or more chemical reactions and/or to remove unwanted material. The flowcell may enable the imaging by facilitating that the sample in the flowcell channel can be subjected to illuminating light and that any fluorescent responses from the sample can be detected. Some implementations of the system may be designed to be used with at least one flowcell, but may not include the flowcell(s) during one or more stages, such as during shipping or when delivered to a customer. For example, the flowcell(s) can be installed into an implementation at the customer's premises in order to perform analysis.

Examples herein refer to coupling of light (e.g., a laser beam) into and/or out of a waveguide by one or more gratings. A grating can couple light impinging on the grating by way of diffracting at least a portion of the light, thereby causing the portion of the light to propagate in one or more other directions. In some implementations, the coupling can involve one or more interactions, including, but not limited to, reflection, refraction and/or transmission of the portion of the light.

FIG. 1 shows an example of an optical layout 100 for planar waveguide illumination. The optical layout 100 can be implemented as part of one or more systems described herein. The optical layout 100 can be used for performing one or more techniques or processes described herein.

The optical layout 100 can include one or more light sources. For example, light sources can provide light having one or more wavelengths. In one implementation described herein, the optical layout 100 includes a laser 102 and a laser 104. In some implementations, the lasers 102 and 104 can be characterized as a green laser and a red laser, respectively. For example, the laser 102 can generate light that has one or more wavelengths in the range of about 400-570 nm. For example, the laser 104 can generate light that has one or more wavelengths in the range of about 620-750 nm. One or more other types of light (e.g., a different wavelength) can instead or additionally be used in some implementations.

Light from either or both of the lasers 102 and 104 can be directed at least one mirror in the optical layout 100. A mirror can be made from one or more materials that provide a partial or total reflection of the type(s) of light generated by the relevant light source. For example, a transparent substrate can be provided with a mirror coating. Here, a mirror 106 is used for the light beam from the laser 102. Prism mirrors can be used to combine two beams with a small angle difference. Dichroic mirrors can be used to combine two/three different wavelengths. Mirrors can be mounted on actuated stages for automatic alignment.

The light beam(s) generated in the optical layout 100 can be shaped or otherwise conditioned in one or more ways. In some implementations, one or more beam-shaping optics 108 can be used. For example, the beam-shaping optics 108 can serve to provide an aperture for the light beam, to transform the light beam, and/or to integrate components of the light beam in one or more ways. A separate one of the beam-shaping optics 108 (identical ones or different ones) can be provided for the light beams of the lasers 102 and 104, respectively.

The light beam(s) shaped by the beam-shaping optics 108 can be directed at least one mirror in the optical layout 100. Here, a mirror 110 is used for the light beams of both the lasers 102 and 104. The mirror 106 can be adjusted to control the direction of the light beam(s). In some implementations, a coupling angle of the light beam at an object plane can be adjusted using the mirror 106. For example, the object plane can be defined at a component (e.g., a grating) that is positioned downstream of the light beam(s) in the optical layout 100. The mirror 110 can be adjusted using one or more actuators. In some implementations, the mirror 110 is electrically adjustable. For example, the mirror 110 can be actuated using one or more piezoelectric motors.

The optical layout 100 can include one or more components for focusing the light from at least one light source. In some implementations, a tube lens 112 can be used. For example, the tube lens can be used to focus the light beam(s) into an intermediate image that is provided to an infinity corrected objective in the optical layout 100. Here, the tube lens 112 receives the light beams that originated at the lasers 102 and 104, respectively.

The mirror 110 can be placed in a position selected based on one or more other components in the optical layout 100. In some implementations, the placement of the mirror 110 can depend at least in part on the characteristics and location of the tube lens 112. For example, the mirror 110 can be placed at a back focal plane 114 of the tube lens 112 with regard to an object plane, such as a planar waveguide at a flowcell.

That is, light generated by the laser 102 can form a laser beam 116 that propagates from the mirror 110 toward the tube lens 112. Similarly, light generated by the laser 104 can form a laser beam 118 that propagates from the mirror 110 toward the tube lens 112. Each of the laser beams 116 and 118 can be generated so as to propagate in the same or a different direction.

In some implementations, the direction(s) can be characterized with regard to an optical axis 120 of the tube lens 112. For example, the laser beam 116 can form an angle 122 with regard to the optical axis 120. For example, the laser beam 116 can form an angle 124 with regard to the optical axis 120. The angles 122 and 124 can be selected so as to provide a specific coupling angle (the same or different) for the respective laser beams 116 and 118 at a downstream component, such as a grating.

The tube lens 112 can direct the laser beams 116 and 118 at one or more components in the optical layout 100. In some implementations, the tube lens 112 directs the light at a mirror 126 that reflects at least part of the light toward an objective lens 128 in the optical layout 100. For example, the mirror 126 can be a dichroic mirror having the characteristic that it reflects into the objective lens 128 a significant portion of incident light having the wavelength(s) of the lasers 102 and 104, while also having the characteristic of transmitting a significant portion of light having one or more other wavelengths. The reflected portion of the light from the lasers 102 and 104 can be at least an amount such that the reflected light sufficiently illuminates a downstream component, such as a planar waveguide of a flowcell. In other implementations, the optical layout 100 can instead be arranged for the mirror 126 to at least in part transmit the illuminating light (i.e., the light originating at the lasers 102 and 104) into the objective lens 128, and at least partially reflect other light emerging from the objective lens 128.

The objective lens 128 can include one or more lenses and/or other optical components. In some implementations, the objective lens 128 can include the components shown in FIG. 2. The objective lens 128 can serve to direct illuminating light at one or more components of the optical layout 100. The objective lens 128 can serve to capture imaging light and provide it to one or more components of the optical layout 100.

The optical layout 100 includes a flowcell 130. In some implementations, the flowcell can include any flowcell described or shown elsewhere herein. For example, the flowcell 130 can include one or more channels 132 configured to hold sample material and to facilitate actions to be taken with regard to the sample material, including, but not limited to, triggering chemical reactions or adding or removing material. Here, a cross section of the channel 132 in a longitudinal direction is shown. That is, if a liquid is flowed through the channel 132, the main flow direction of the liquid can be into or out of the drawing in this illustration.

An object plane 134 can be defined with regard to another component in the optical layout 100. Here, the object plane 134 is defined at least in part by the objective lens 128. In some implementations, the object plane 134 extends through the flowcell 130. For example, the object plane 134 can be defined so as to be adjacent the channel(s) 132.

The objective lens 128 can define a field of view 136. The field of view 136 can define the area on the flowcell 130 from which an image detector captures imaging light using the objective lens 128. One or more image detectors can be used. For example, when the lasers 102 and 104 generate respective laser beams having different wavelengths (or different wavelength ranges), the optical layout 100 can include separate image detectors for the respective wavelengths (or wavelength ranges).

One or more diffraction gratings can be placed in relation to the objective lens 128. In some implementations, gratings 138 and 140 can be placed at or near the object plane 134. For example, the gratings 138 and 140 can be placed on opposite sides of the channel 132. That is, the gratings 138 and 140 can be placed so as to define a transverse direction across the channel 132, perpendicular to a longitudinal direction of the channel 132. The gratings 138 and 140 are placed outside the sensor field of view 136.

The gratings 138 and 140 can direct light into and/or out of a planar waveguide in the flowcell 130. Here, beams 142 and 144 are incident on the grating 138. In some implementations, the beams 142 and 144 can correspond to the laser beams 116 and 118, respectively, and can define an illumination area in the flowcell 130 (e.g., in a planar waveguide within the flowcell 130). For example, the beam 142 and the beam 144 can be incident on the grating 138 at different coupling angles. As another example, the beam 142 and the beam 144 can be incident on the grating 138 at different locations in the longitudinal direction of the channel 132. Here, beams 146 and 148 are emerging from the grating 140. For example, the beam 146 can correspond to at least a portion of the beam 142 after having traversed a planar waveguide in the flowcell 130. For example, the beam 148 can correspond to at least a portion of the beam 144 after having traversed a planar waveguide in the flowcell 130.

The gratings 138 and 140 can be identical or similar to each other, or can be different types of gratings. The grating(s) can include one or more forms of periodic structure. In some implementations, the grating 138 and/or 140 can be formed by removing or omitting material from the flowcell 130 (e.g., from a waveguide material that is included in the flowcell 130). For example, the flowcell 130 can be provided with a set of slits and/or grooves therein to form the grating 138 and/or 140. In some implementations, the grating 138 and/or 140 can be formed by adding material to the flowcell 130 (e.g., to a waveguide material that is included in the flowcell 130). For example, the flowcell 130 can be provided with a set of ridges, bands or other protruding longitudinal structures to form the grating 138 and/or 140. Combinations of these approaches can be used.

Within the field of view 136, the objective lens 128 can capture imaging light from the flowcell 130. For example, the imaging light can include luminescence. This imaging light propagates through the objective lens 128 and emerges at the other end thereof. The optical layout 100 can use one or more components to direct the imaging light in a different direction that that from which the illuminating light (i.e., the light from the lasers 102 and 104) arrived. Here, the mirror 126 can be a dichroic mirror. For example, a dichroic mirror can reflect at least part of the imaging light and transmit at least part of the illuminating light. Instead, a dichroic mirror can transmit at least part of the imaging light and reflect at least part of the illuminating light. A signal 150 here represents transmission of the imaging light to one or more image sensors 152. In some implementations, the imaging light includes fluorescence light from the flowcell 130. For example, the image sensor 152 can include a time delay and integration (TDI) sensor.

The objective lens 128 can be chosen to have a numerical aperture that allows the grating 138 and/or 140 to be illuminated outside of the field of view 136. In some implementations, the numerical aperture is less than one. For example, numerical apertures of 0.95, 0.75, 0.7, 0.3 and/or 0.2 can be used. In some implementations, a greater numerical aperture can be used with water/oil immersion objective lenses, for example a numerical aperture of 1.2 to 1.4 or greater.

In some implementations, the size of the flowcell 130 can necessitate capturing of multiple images by scanning along the longitudinal direction (into and/or out of the drawing) of the channel 132. The illumination light (e.g., the beams 142 and 144) can then be co-registered with the field of view 136 by virtue of the objective lens 128 both directing the illuminating light from the lasers 102 and 104 at the grating 138 and/or 140, and defining the field of view 136. That is, the lasers 102 and/or 104, the objective lens 128 and the grating 138 and/or 140 can serve for co-registering an illumination area on the flowcell 130 with the field of view 136 of the image sensor on the flowcell 130, at successive locations on the flowcell.

The optical layout 100 is an example of a system that includes an objective lens (e.g., the objective lens 128); a light source (e.g., the lasers 102 and 104) to feed illuminating light (e.g., the laser beams 116 and 118) through the objective lens and into a flowcell (e.g., the flowcell 130) to be installed in the system, the illuminating light to be fed using a grating (e.g., the grating 138) on the flowcell; and an image sensor to capture imaging light using the objective lens, wherein the grating is positioned outside a field of view (e.g., the field of view 136) of the image sensor.

The optical layout 100 is an example of a system that can be used with first and second gratings (e.g., the gratings 138 and 140) positioned on a flowcell (e.g., the flowcell 130).

The optical layout 100 is an example of a system where first illuminating light from a first light source (e.g., the laser 102) comprises a first light beam (e.g., the laser beam 116) of a first wavelength, and where the system further comprises a second light source (e.g., the laser 104) to feed second illuminating light through an objective lens, the second illuminating light comprising a second light beam (e.g., the laser beam 118) of a second wavelength.

The optical layout 100 is an example of a system that includes a mirror (e.g., the mirror 110) and a tube lens (e.g., the tube lens 112) positioned after first and second light sources (e.g., the lasers 1102 and 104) and before an objective lens (e.g., the objective lens 128), wherein respective angles of the first and second light beams (e.g., the angles 122 and 124) in propagation from the mirror to the tube lens reflect corresponding incident angles of the first and second light beams on the grating (e.g., the respective coupling angles of the beams 142 and 144).

The optical layout 100 is an example of a system having a mirror (e.g., the mirror 106) positioned after a light source (e.g., the laser 102) and before a mirror (e.g., the mirror 110), the mirror to provide a spatial separation of the first and second light beams on the grating (e.g., the different incidence locations on the grating 138 of the beam 142 and the beam 144 in the longitudinal direction of the channel 132).

Figure 2:
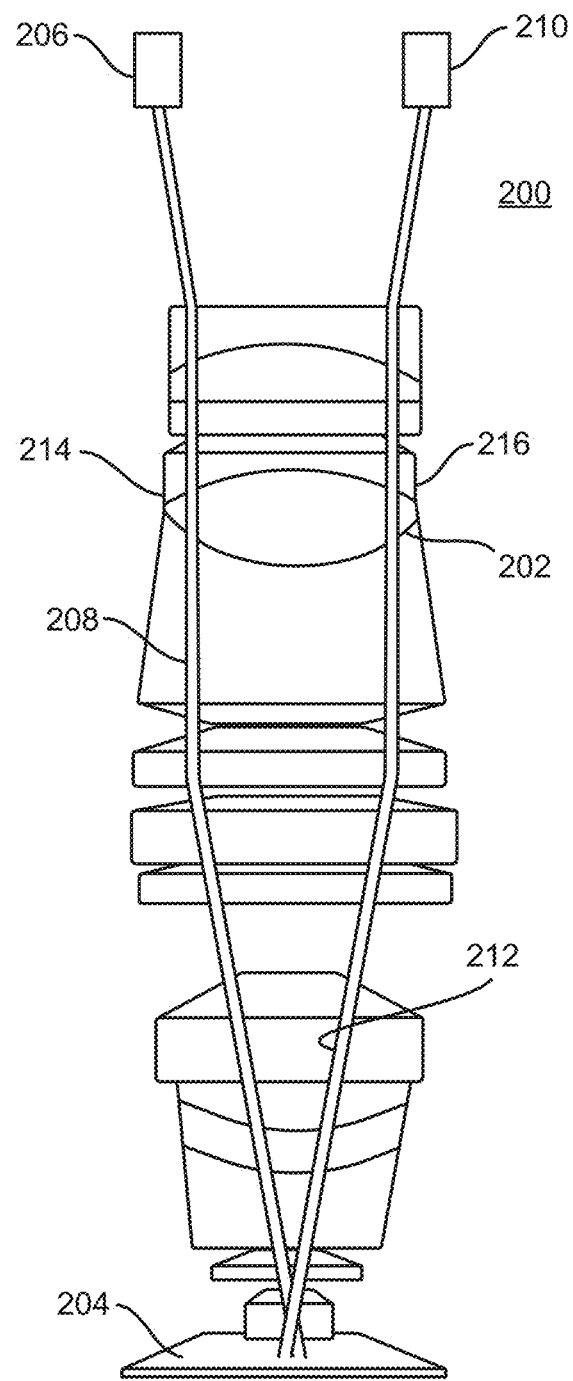
FIG. 2 shows an example of an objective lens.

FIG. 2 shows an example of an objective lens 200. The objective lens 200 can include multiple lenses 202 arranged (here in a coaxial manner) so as to allow transmission of light in both directions and to manipulate the light in one or more ways. The objective lens 200 is here directed at a flowcell 204. For example, the flowcell 204 can have one or more gratings that allow coupling of light into and/or out of a planar waveguide in the flowcell 204.

The objective lens 200 can be used with one or more light sources. Here, a laser 206 is positioned at one end of the objective lens 200. In some implementations, the laser 206 generates a laser beam 208 into the objective lens 200. For example, the laser beam 208 can have a wavelength of about 532 nm. Here, a laser 210 is positioned at the same end of the objective lens 200. In some implementations, the laser 210 generates a laser beam 212 into the objective lens 200. For example, the laser beam 212 can have a wavelength of about 660 nm. The laser beam 208 can be directed so as to propagate at or near a side 214 of the objective lens 200. The laser beam 212 can be directed so as to propagate at or near a side 216 of the objective lens 200 that is opposite the side 214.

In some implementations, the laser beams 208 and 212 are incident on respective gratings on the flowcell 204. In some implementations, the grating where the laser beam 208 enters the planar waveguide can be the grating where the laser beam 212 exits the planar waveguide, the laser beam 212 having entered the planar waveguide at its corresponding grating. Correspondingly, the grating where the laser beam 212 enters the planar waveguide can be the grating where the laser beam 208 exits the planar waveguide, the laser beam 208 having entered the planar waveguide at its corresponding grating. If no blocking is done, the exiting light beams can propagate into the objective lens 200.

The above example illustrates that a system can include a first light source (e.g., the laser 206) directing a first light beam (e.g., the laser beam 208) at a first side (e.g., the side 214) of an objective lens (e.g., the objective lens 200), and a second light source (e.g., the laser 210) directing a second light beam (e.g., the laser beam 212) at a second side (e.g., the side 216) of the objective lens opposite the first side. The above example illustrates that a system can provide illuminating light that comprises a first light beam of a first wavelength (e.g., the laser beam 208), and a second light beam of a second wavelength (e.g., the laser beam 212), and that the first light beam can be directed at a first side (e.g., the side 214) of an objective lens (e.g., the objective lens 200), and that the second light beam can be directed at a second side (e.g., the side 216) of the objective lens opposite the first side.

The above example illustrates that a system (e.g., including the objective lens 200 and the lasers 206 and 210) can be used with first and second gratings positioned on opposite sides of a planar waveguide that illuminates a flowcell (e.g., the flowcell 204), the first grating coupling first illuminating light (e.g., the laser beam 208 or 212) into the planar waveguide, and the second grating coupling the first illuminating light out of the planar waveguide.

Figure 3:
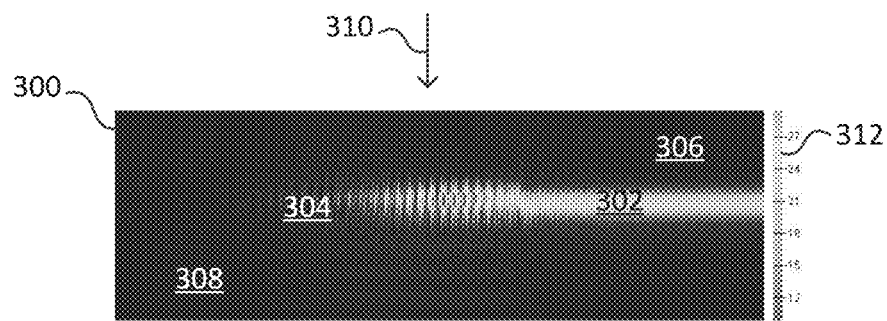
FIG. 3 shows an example of a flowcell with a waveguide and a grating.

FIG. 3 shows an example of a portion of a flowcell 300. The flowcell has a waveguide 302 and a grating 304, each of which is partially shown in the portion of the flowcell 300. The material(s) for the waveguide 302 can include $Ta_2O_5$, having a refractive index of about 2.1. For example, the waveguide 302 can have a thickness of about 100-200 nm. A specified thickness for the waveguide 302 can have a tolerance of about ±2.5 nm in some implementations. An area 306 of the flowcell 300 (e.g., a cladding positioned above the waveguide 302 and the grating 304 in this view) can have a refractive index comparable to that of water. An area 308 of the flowcell 300 (e.g., a substrate positioned below the waveguide 302 and the grating 304 in this view) can have a refractive index comparable to that of certain glass. In some implementations, the area 308 can include the material glass substrate with a refractive index of about 1.5. For example, the area 308 can have a thickness of about 300 micrometers (μm). The grating 304 can include $SiO_2$ having a grating thickness of about 10-100 nm. A specified grating thickness for the grating 304 can have a tolerance of about ±2.5 nm. For example, the grating 304 can have a duty cycle of about 50±10%.

The illustration shows a design model for the flowcell 300. In some implementations, the image showing the flowcell 300 can be generated using finite-difference time-domain analysis. For example, the image can be generated using a software system that provides physics modeling.

In the flowcell 300, incident light (e.g., a laser beam) enters as indicated by an arrow 310 and is at least in part refracted by the grating 304. The refracted portion of the light propagates in the waveguide 302. The coupling angle depends on the (laser) wavelength, grating pitch/depth, and the refractive index. Intensity of light is indicated by shading according to a scale 312. A maximum coupling efficiency can be about 40%. The design can be chosen so that symmetric coupling angles or preferred angles by optical platform are defined for light of multiple wavelengths. For example, the grating 304 can have one or more symmetric coupling angles for a red laser beam and a green laser beam.

In some implementations, a grating can be made from $SiO_2$. In some implementations, a grating can be designed with the following characteristics:

| Planar waveguide thickness (nm) | Grating pitch (nm) | Laser wavelength (nm) | Coupling angle (degrees) | Cladding in design | Grating length (mm) | Grating spacing (mm) |
|---|---|---|---|---|---|---|
| 50-1000 | 200-500 | 400-1000 | 0-40 or greater | Water/SiO2/Polymer | 0.05-0.5 | 0.2-50 mm |

Figure 4:
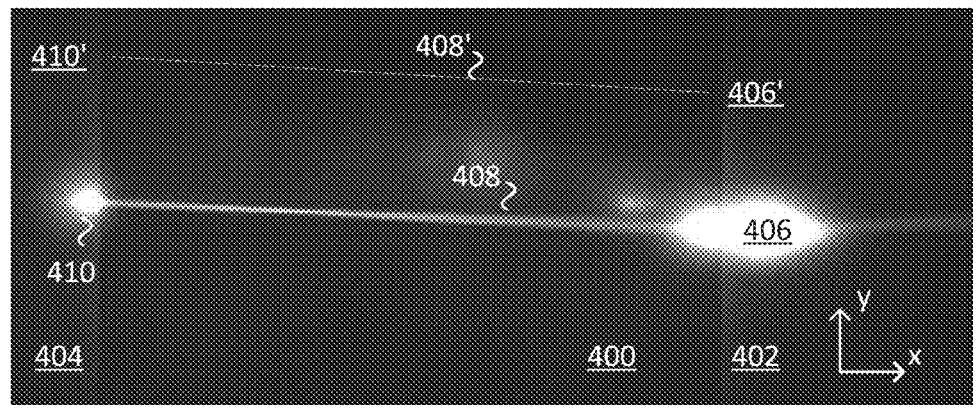
FIG. 4 shows an example of coupling of a laser beam into and out of a planar waveguide using gratings.

FIG. 4 shows an example of coupling of a laser beam into and out of a planar waveguide 400 using gratings 402 and 404. The gratings 402 and 404 can have the same coupling angle, or different coupling angles, for a given wavelength of light. For example, the gratings 402 and 404 can have the same or different grating periods. The gratings 402 and 404 are positioned so that the space on the planar waveguide 400 matches the size of the imaging sensor that will be used when imaging samples (e.g., genetic material). The image shown in FIG. 4 can be captured using a different camera or other image sensor than what is intended to be utilized when the planar waveguide 400 and the gratings 402 and 404 are used in operation. For example, the image can be captured with a 2D charge-coupled device camera. The planar waveguide 400 can include any suitable material, including, but not limited to, those described in other examples herein. The gratings 402 and 404 can include any suitable material (the same or different from each other), including, but not limited to, those described in other examples herein.

An area 406 on the grating 402 is the reflection generated by a laser beam being directed at the grating 402. The laser beam impinges on the grating 402 at a coupling angle so that the laser beam is at least partially coupled by the grating 402 and enters the planar waveguide 400 as a line 408. In some implementations, the laser beam can have an approximately elliptical cross section. For example, the laser beam can have a greatest dimension that is on the order of about 100 µm, but smaller or larger sizes can be used. In some implementations, a smaller beam size can provide a greater tolerance of the coupling angle. For example, on some gratings a 100 µm laser beam can have a coupling angle tolerance of about 0.5 degrees. An area 410 on the grating 404 corresponds to the laser beam of the line 408 exiting the grating 404.

For example, the line 408 can be used to illuminate a sample in a flowcell to which the waveguide 400 and the gratings 402 and 404 are applied. The line 408 can be on the order of about 8-150 µm wide in some implementations. The narrowest area of the line 408 (sometimes referred to as a waist) can be on the order of about 7 µm. This can be considered in relation to the line width specifications of some existing sequencing systems. For example, one existing system may specify a line width of 3-8 µm, another system may specify a line width of 10-24 µm, and yet another system may specify a line width on the order of 40 µm. In some implementations, beam propagation loss can be less than 10% over a distance of about 1 mm, which can be an approximate width of the planar waveguide 400 in the x-direction. For example, the planar waveguide can be about 1.2 mm wide and up to about 100 mm long. This can define uniformity of about 90% in-line illumination for some detectors (e.g., a TDI scanner). An angle tolerance in the y-direction can be greater than about ±3 degrees on a flowcell.

In use, the image sensor that captures imaging light from the flowcell can be arranged and configured so that its field of view includes the line 408 while not including the areas 406 and 410, in order to avoid or reduce the occurrence of laser light in the image. In some implementations, the field of view can be a narrow sliver that covers essentially only the line 408 within the planar waveguide 400. For example, the field of view can have a width of about 10-24 µm. For example, the field of view can have a length of about 800 µm, 1000 µm or 2000 µm.

Beams of different wavelengths can be spatially differentiated on the flowcell. In some implementations, a green laser beam, say, should impinge at a different location on the grating 402 than, say, a red laser beam. For example, this can eliminate or reduce crosstalk between signals from the respective laser beams. The green laser beam can then be spaced apart from the red laser beam in the y-direction. For example, an area 406' on the grating 402 schematically illustrates incidence of the green laser beam. For example, a line 408' schematically shows the coupling of the green laser beam into the planar waveguide 400, essentially parallel with the line 408. For example, an area 410' on the grating 404 schematically illustrates coupling of the light of the line 408' out of the planar waveguide 400.

Figure 5:
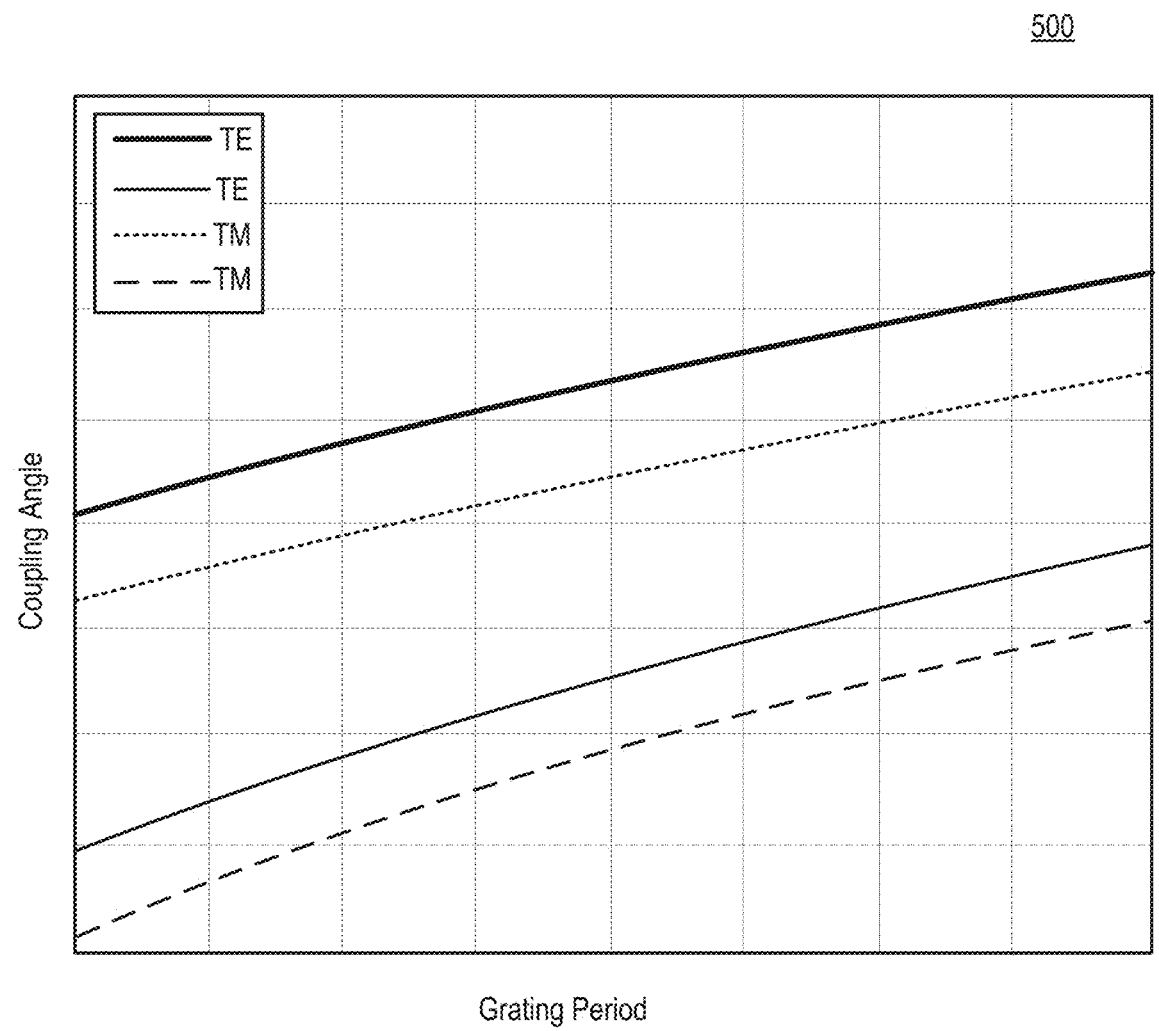
FIG. 5 shows an example graph of coupling angle versus grating period.

The grating 402 and/or 404, and other gratings described herein, can be designed to have one or more symmetric coupling angle. FIG. 5 shows an example graph 500 of coupling angle versus grating period. Coupling angle is marked against the vertical axis and grating period (in nm) is marked against the horizontal axis. Four beams are illustrated, two of them transverse electric (TE) mode beams and the other two transverse magnetic (TM) mode beams. In this non-limiting working example, one TE beam and one TM beam had a 532 nm wavelength. The other TE beam and the other TM beam had a 660 nm wavelength. The waveguide included $Ta_2O_5$ of a 110 nm thickness, and the substrate included a glass material with a refractive index of about 1.5 and with low autofluorescence. A cover water buffer had a refractive index of about 1.34 for imaging.

The graph 500 shows simulation results for coupling angle versus grating period. Multiple angles of symmetric coupling can be identified. For example, three grating periods allow symmetric coupling, 342 nm, 354 nm and 358 nm. The symmetric coupling angles at those grating periods are +−13.72, +−16.85 and +−8.79 degrees, respectively, indicating that the diffraction can be in either direction from a normal of the grating. As such, the graph 600 illustrates that a system with more than one light source, and at least first and second wavelengths, can be used with a grating with symmetric coupling angle(s) for the first and second wavelengths. Additional parameters can impact the coupling efficiency and the coupling angle. For example, this can include waveguide thickness, grating depth, shape, the refractive index of the waveguide, cladding and/or substrate, the wavelength, and beam polarization.

Known physical relationships, including, but not limited to, a general wave equation, can be used for further analyzing the propagation of electromagnetic waves in the materials. For example, simulations can be performed and used as a basis for designing a planar waveguide or another component.

Figure 6:
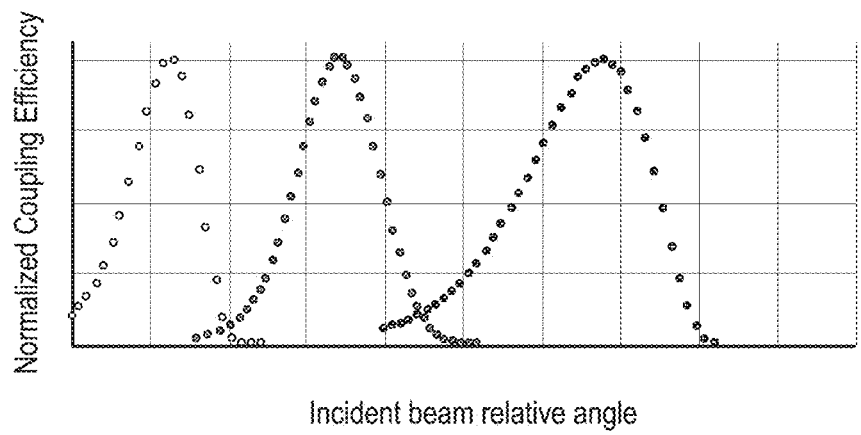
FIG. 6 shows an example graph of coupling angle tolerance versus beam diameter for multiple wavelengths.

FIG. 6 shows an example graph 600 of coupling angle tolerance analysis. A normalized coupling efficiency is marked against the vertical axis, and an incident beam relative angle in degrees is marked against the horizontal axis. An x-tilt angle tolerance of 0.57° can be achieved by smaller beam size. Higher tolerance can be provided by further reducing beam diameter but increasing position alignment sensitivity. The coupling angle tolerance shown in the graph 600 can be about ten times the stage tilting resolution, and can show low risk on scan imaging.

Figure 7:
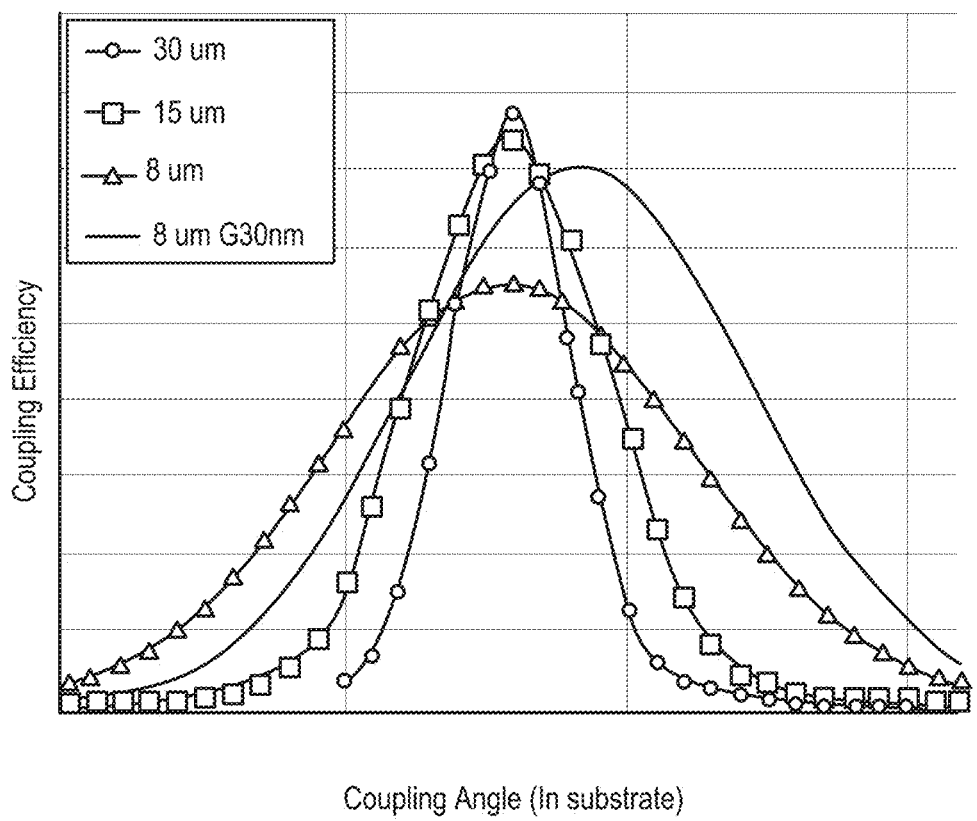
FIG. 7 shows an example graph of simulated angle tolerance versus beam waist.

FIG. 7 shows an example graph 700 of simulated angle tolerance versus beam waist. If an implementation were to be very sensitive to the incident angle of the illuminating light, then the line in the planar waveguide can become brighter or dimmer as the sample is moved during the scanning. In the graph 700, a coupling efficiency is marked against the vertical axis, and a coupling angle in the substrate is marked against the horizontal axis. Four example beams are marked in the graph 700, having decreasing beam waists 30 μm, 15 μm, 8 μm and 8 μm (with 30 nm grating depth between peak and trough), respectively. The graph 700 shows that coupling angle tolerance increases with decreasing beam waist. The graph 700 also shows that the coupling efficiency of a small-size beam can still reach over 35% after optimization of grating depth. To improve angle tolerance, small beam modeling and high numerical aperture objective lens for imaging can provide a small beam diameter without significant cost or challenges.

Figure 8:
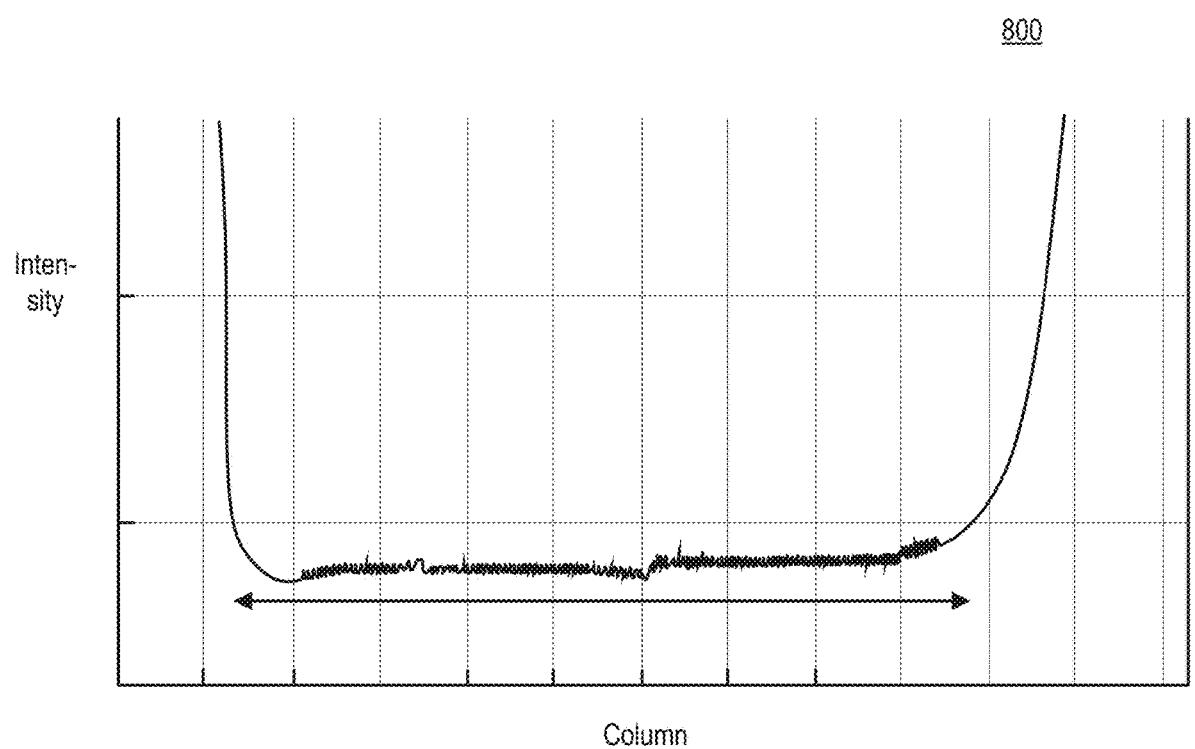
FIG. 8 shows an example graph of intensity across a waveguide.

FIG. 8 shows an example graph 800 of intensity across a waveguide. Intensity is marked against the vertical axis and the position across the planar waveguide (e.g., in form of a column number) is marked against the horizontal axis. The graph 800 shows that there can be uniformity at more than 90% of the waveguide. For example, this can be a 600 μm region at a center of the waveguide. Edge background in the graph 800 can be due to dye solution artificial effects.

Figure 9:
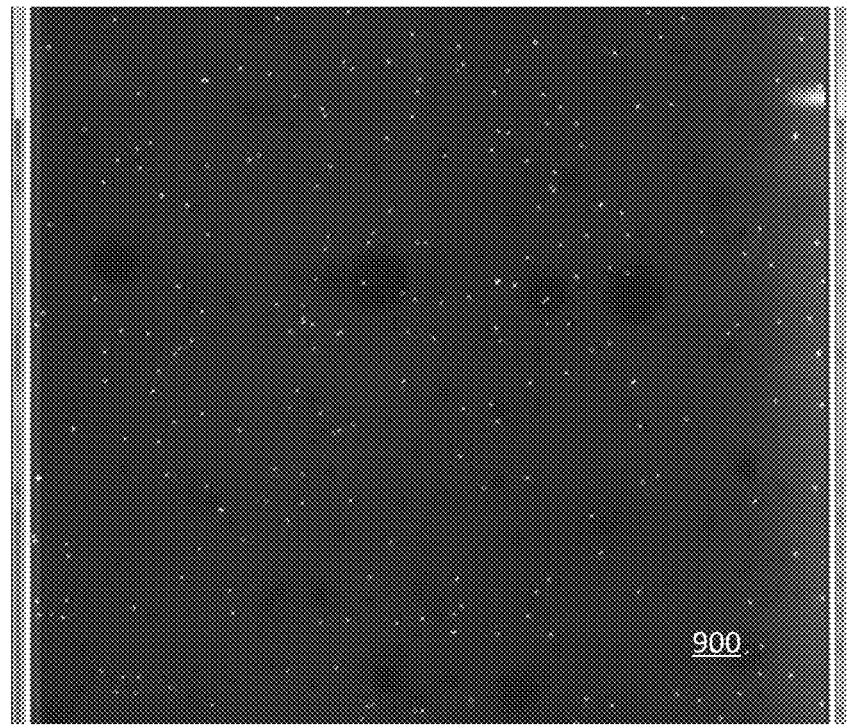
FIG. 9 shows an example image constructed from line scans.

Samples can be tested to evaluate planar waveguide illumination for line scan imaging. Such samples can include, but are not limited to, fluorescent beads, a dye molecule carpet, and clusters of genetic material. FIG. 9 shows an example image 900 constructed from line scans. The image 900 can be constructed from multiple line scans. The image 900 has a size of 800 μm×800 μm. The scanning can be performed over 1.6 mm at multiple locations and/or lanes. The image 900 is shown for illustrative purposes, and in an actual situation the height can be on the order of about 75 mm or 100 mm, to name just two examples.

The image 900 shows uniform beads and background. The illumination was uniform along a long scan region from about 100 μm up to about 5 mm without adjustment of the coupling angle or position. At one edge of the image 900 grating background is presently visible. A design can be provided with a margin to address this situation. For example, a gutter of about 100 μm can be used for a grating coupler in a flowcell with a planar waveguide without significant cost or other disadvantage.

Figure 10:
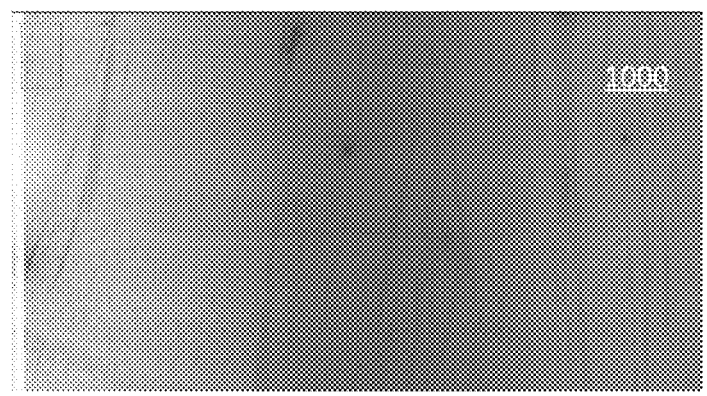
FIG. 10 shows an example image of fluorescence dye molecules.

FIG. 10 shows an example image 1000 of fluorescence dye molecules. The image 1000 is taken of high density fluorescence dye molecules on top of a polymer layer. Irregularities in the image 1000 are not necessarily due to the illumination or imaging technique. Rather, the image 1000 can visualize interface details. For example, the image 1000 can show waveguide defects, surface patterns and/or other defects in the polymer layer or a glass substrate, and/or bubbles or dust on a grating.

Figure 11:
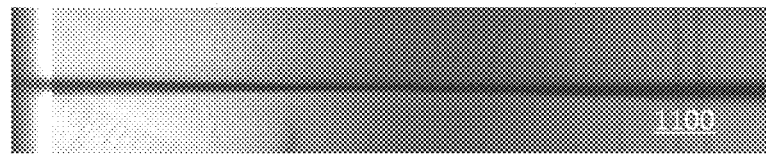
FIG. 11 shows an example image of a laser beam shape within a waveguide.
Figure 12:
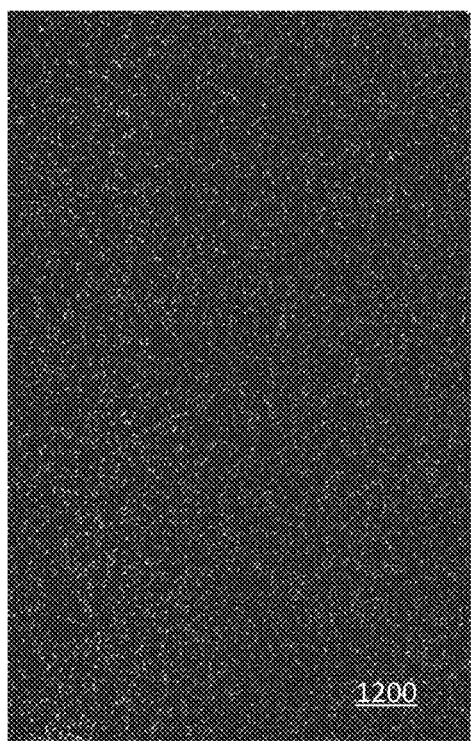
FIGS. 12-15 show example images of clusters of genetic material.
Figure 13:
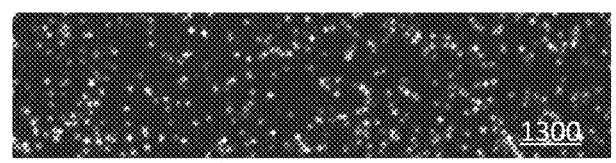
Figure 14:
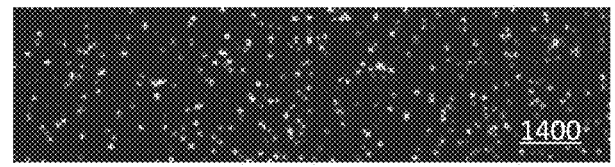
Figure 15:
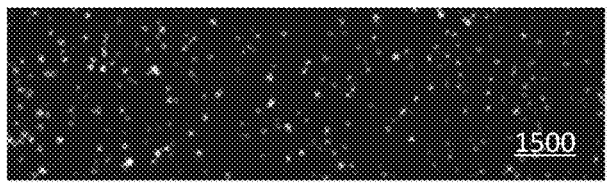

FIG. 11 shows an example image 1100 of a laser beam shape within a waveguide. A photobleaching pattern in the image 1100 can show a laser beam shape within a waveguide.

FIGS. 12-15 show example images 1200, 1300, 1400 and 1500 of clusters of genetic material. The images have very low background and high SNR at lower power. In some implementations, the power can be on the order of 40 times lower than a setup of an existing system. For example, the existing system may involve 280 mW of laser power and the image 1200 may be taken at 3.1 mW of laser power. The illumination is uniform across the full field of view of the image sensor and across the scanning.

The image 1200 is 800 μm wide and shows the exit of a planar waveguide plate. The images 1300-1500 are zoomed in compared to the image 1200. The image 1300 is taken at 11 mW with an SNR of 314. The image 1400 is taken at 3.1 mW with an SNR of 154. The image 1500 is taken at 0.4 mW with an SNR of 35.

The SNR analysis shows that much lower power may be involved for the same SNR or signal compared to an existing system using the same analysis model. One hypothesis can be that background light is much higher at the same signal level compared to standard imaging. Another hypothesis can be that an equivalent SNR (compared to standard imaging) can be achieved at lower signal level.

The SNR analysis can show that at a signal equivalent to an existing system, the planar waveguide can show eight times reduction in background level, a two times improvement in SNR and/or a 30 times lower power use. This corresponds to the ability to lower the laser power in a system. The SNR analysis can also show that an SNR equivalent to that of an existing system can be achievable with a two times lower signal, a 70 times reduction in laser power, and/or lower DNA photodamage and laser induced objective damage or contamination.

In short, up to about a 20-70 times reduction in laser power can be achieved. This can lower some accounting metrics relating to the instrument, such as the cost of goods sold. This can de-risk laser damage to optics or the flowcell and objective contamination. The signal to background ratio can be improved up to about eight times. This can provide improved data quality. For example, a potential for enabling small clusters can be enabled. A laser exposure dose can be reduced by about two to four times. This can provide a reduction in DNA photodamage.

Figure 16:
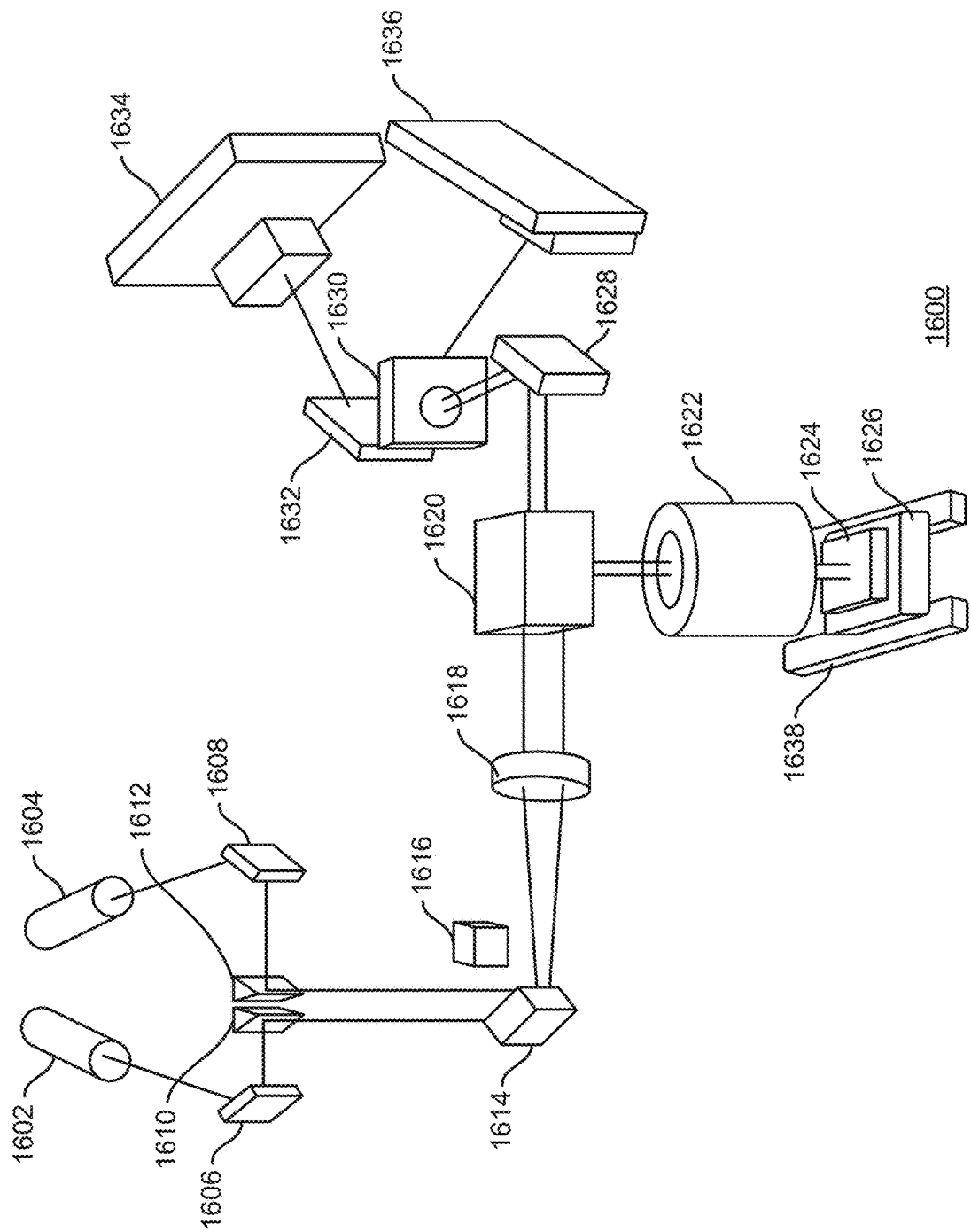
FIG. 16 schematically shows an example of a system for laser illumination and fluorescence imaging.

FIG. 16 schematically shows a system 1600 for laser illumination and fluorescence imaging. The system 1600 can be used with any components, layouts or techniques described herein. The system 1600 includes lasers 1602 and 1604. In some implementations, the lasers 1602 and 1604 can generate light of different wavelengths. For example, laser light can be propagated through one or more optical fibers (not shown) in some aspect of the system 1600. The system 1600 includes mirrors 1606 and 1608. For example, the laser 1602 can direct light at the mirror 1606, and the laser 1604 can direct light at the mirror 1608. The system 1600 includes prisms 1610 and 1612. For example, the mirror 1606 can direct light at the prism 1610, and the mirror 1608 can direct light at the prism 1612. The system 1600 can include a mirror 1614. In some implementations, the mirror 1614 has a piezoelectric actuator. For example, the prisms 1610 and 1612 can both direct respective light at the mirror 1614. In some implementations, one or more alignment targets 1616 can be positioned in the path of a laser beam. For example, the alignment target 1616 can include an aperture for laser light. The mirror 1614 can direct the laser beams at a tube lens 1618. For example, the angle of the respective laser beam as it propagates between the mirror 1614 and the tube lens 1618 can define the coupling angle of that laser beam at a downstream component, such as one or more gratings.

The components 1602-18 can be installed on a suitable bench or other surface, such as an optics table or equivalent. The components 1602-18 can collectively be referred to as excitation optics, or alternatively as a planar waveguide plate. The following are characteristics or parameters that can apply to a planar waveguide plate: a diode laser (e.g., the laser 1602 and/or 1604) of 532/660 nm wavelength can be used; 35/50 mW laser effect can be applied; an optical fiber single mode can be used. A piezo mirror (e.g., the mirror 1614) can have vertical and/or horizontal actuation; can optimize coupling angles into a tube lens (e.g., the tube lens 1618) and a flowcell grating; and can be positioned on a back focal plane of a tube lens. Linear translators or mirrors (e.g., the mirrors 1606 and/or 1608) can be used for coarse alignment.

The system 1600 can include a component 1620 that receives light from at least the tube lens 1618. For example, the component 1620 can be characterized as an optical structure, or illumination optics, or both. For example, the component 1620 can include a mirror that reflects the light from the tube lens 1618 in a horizontal direction (e.g., into the drawing in this view) and another mirror that reflects the light from the tube lens 1618 in a vertical direction (e.g., downward in the drawing in this view). The system 1600 can include an objective lens 1622. For example, the objective lens 1622 can include multiple lenses or other optics. The system 1600 can include a sample 1624 that is the target of light from the objective lens 1622. For example, the sample can be provided in a flowcell that has a planar waveguide and gratings for coupling the light from the objective lens 1622. The sample 1624 can be positioned on one or more stages 1626 in the system 1600. For example, the stage 1626 can include a chuck or other component for mechanically fixating the flowcell during an imaging or scanning operation.

Illumination of the sample 1624 can generate a fluorescent response from genetic material in the sample. This response can be characterized as imaging light in the system 1600. The imaging light can enter the objective lens 1622 and can be propagated into the component 1620. For example, a dichroic mirror in the component 1620 can direct the imaging light in another direction, such as toward a mirror 1628. The mirror 1628 can direct the imaging light toward a projection lens 1630 in the system 1600, after which the imaging light can be incident on a component 1632. The component 1632 can redirect and/or condition the imaging light in one or more ways. For example, such conditioning can be part of a sensing or detection process for the imaging light. Here, the component 1632 includes a mirror that redirects the imaging light toward either or both of respective image sensors 1634 and 1636. In some implementations, each of the image sensors 1634 and 1636 can handle imaging light resulting from illumination with light of a particular color. For example, the image sensors 1634 and 1636 can be TDI sensors. Other techniques for detection of the imaging light can be used.

The system 1600 can include one or more tracks 1638. In some implementations, the track(s) can facilitate relative motion between, on the one hand, at least the sample 1624, and on the other hand, at least the objective lens 1622. This can facilitate imaging of a larger area of the sample 1624, for example by scanning over the length of one or more channels in a flowcell. For example, when the image sensor 1634 and/or 1636 includes a TDI sensor, the stage 1626 can be a movable stage by virtue of the track(s) 1638, so that the TDI sensor(s) can scan line images of successive areas of the flowcell holding the sample 1624.

Thermal treatment can be applied in the system 1600 or other implementations. Because the objective lens 1622 delivers the illuminating light and also captures the imaging light, optical access to the backside of the sample 1624 may not be necessary. Thermal conditioning can then be applied, at least in part by way of the backside of the sample 1624. In some implementations, the stage 1626 can be a thermal stage configured for rapid and/or accurate thermal control of the sample 1624. For example, the stage 1626 can maintain the sample at a fixed temperature during an imaging and/or scanning operation.

Dual-surface illumination and imaging can be performed. In some implementations, gratings can have different locations on top and bottom surfaces of a flowcell. In some implementations, gratings can be designed with different coupling angles based on geometry and/or materials. For example, a grating period can be designed differently to provide proper coupling angles for different situations. For example, top and/or bottom coupling angles can have natural differences due to the flipping of cladding/substrate. A buffer can be provided between a glass substrate/cover and the illumination from the top at all times. Combinations of two or more of the above approaches can be used.

Figure 17:
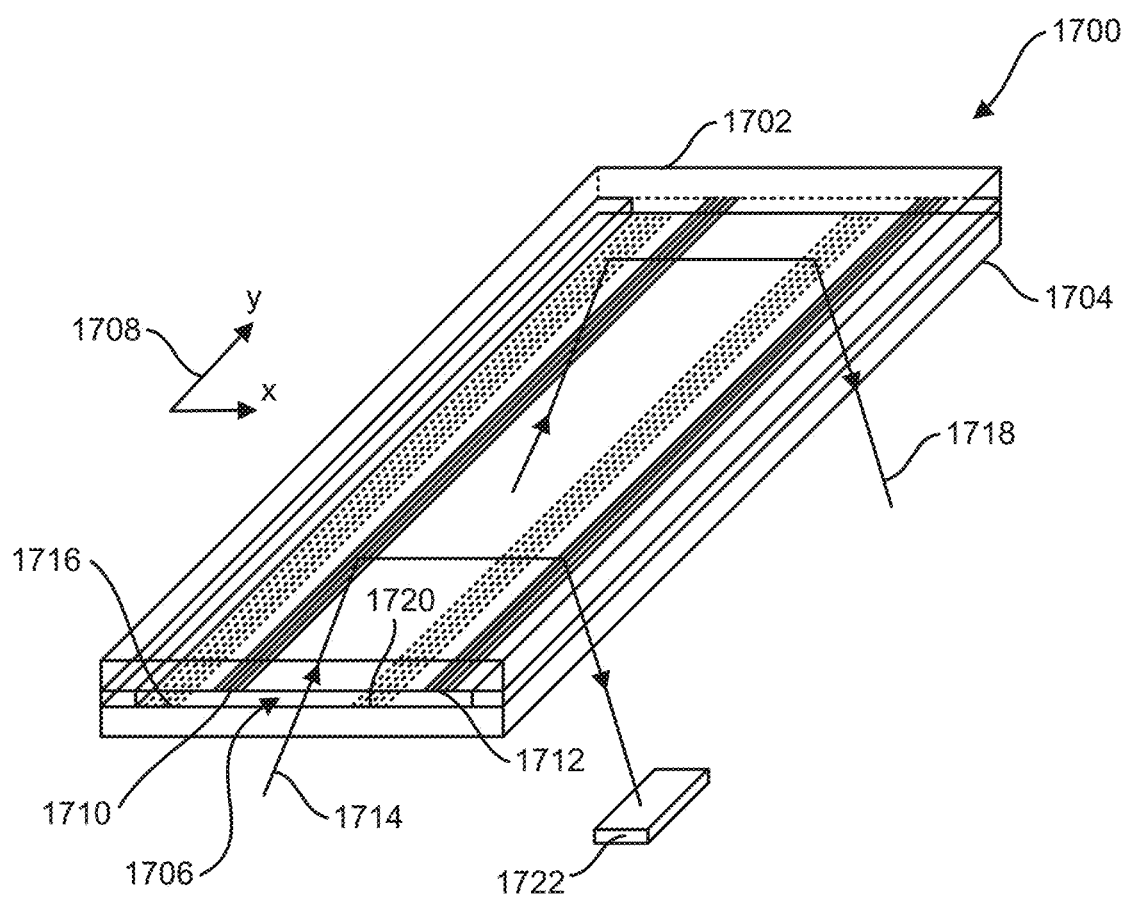
FIG. 17 shows an example of dual surface imaging using a flowcell.

FIG. 17 shows an example of dual surface imaging using a flowcell 1700. The flowcell can be made from any suitable materials, including, but not limited to, those mentioned herein. The flowcell 1700 includes a substrate 1702 (e.g., a top substrate in this view) and a substrate 1704 (e.g., a bottom substrate in this view). One or more channels 1706 can be formed between the substrates 1702 and 1704. For example, the channel(s) 1706 can contain one or more samples (e.g., genetic material) to be exposed to illumination, such as in a sequencing process. A legend 1708 indicates that scanning can be performed in a y-direction and that an x-direction can then be defined across the flowcell 1700 transversely to the direction of scanning.

Gratings 1710 and 1712 can be provided on the substrate 1702. In some implementations, the gratings 1710 and 1712 are provided on a surface of the substrate 1702 facing toward the channel 1706 (in this view, on the bottom surface of the substrate 1702). For example, the grating 1710 can be used to couple a light beam 1714 (which has propagated through the substrate 1704 and through the channel 1706) into a planar waveguide formed by the substrate 1702. As such, the light beam 1714 can travel inside the substrate 1702 in essentially the x-direction and illuminate sample material that is on or adjacent the inward (here bottom) surface of the substrate 1702. For example, the grating 1712 can be used to couple the light propagating in the planar waveguide out of the substrate 1702.

A similar arrangement can be made with the substrate 1704. Here, a grating 1716 on the substrate 1704 (in this view, on the top surface of the substrate 1704) can couple a light beam 1718 that is propagating inside the substrate 1704 into a planar waveguide formed by the substrate 1704, to travel in the x-direction and illuminate sample material that is on or adjacent the inward (here top) surface of the substrate 1704. A grating 1720 (here also on the top surface of the substrate 1704) can be used to couple the light propagating in the planar waveguide out of the substrate 1704.

Fluorescent responses from the sample materials can then be detected in form of imaging light. An image sensor (not shown) can capture the imaging light triggered at (in this view) the top of the channel 1706 by the light beam 1714, and can capture the imaging light triggered at (in this view) the bottom of the channel 1706 by the light beam 1718. For example, the light beams 1714 and 1718 can be activated at different times (e.g., alternatingly) so as to allow separate imaging of the respective surfaces. By delivering the light beams 1714 and 1718 through the same objective lens that is used for capturing the imaging light, co-registration of the illumination and the imaging at every position in the y-direction can be obtained, The light beams 1714 and 1718 can be generated by the same light source or by separate light sources. Different wavelengths can be used with the flowcell 1700. In some implementations, both 532 nm and 660 nm lasers can be used for the light beams 1714 and 1718, respectively. For example, a 532 nm laser beam can have about a 15 degree coupling angle. With another wavelength, such as 460 nm, a smaller grating pitch and/or a larger coupling angle may be used.

The above example can illustrate approaches that can be taken. In some implementations, gratings can be at different locations in top and bottom surfaces. The grating 1710 (on the substrate 1702) and the grating 1716 (on the substrate 1704) are offset from each other in the x-direction. For example, the grating 1710 can be closer to a center of the channel 1706. The grating 1712 (on the substrate 1702) and the grating 1720 (on the substrate 1704) are offset from each other in the x-direction. For example, the grating 1712 can be further from the center of the channel 1706. In some implementations, the difference in location can be on the order of about 100 μm.

Gratings can have different coupling angles. In some implementations, the grating 1710 (on the substrate 1702) and the grating 1716 (on the substrate 1704) can have different coupling angles. For example, a shift in coupling angle of about 1 degree can be used.

In some implementations, difference in location and difference in coupling angles can both be used. For example, the grating 1710 and the grating 1716 can have a difference in location in the x-direction of about 50 and can have a difference in coupling angle of about 0.5 degree.

The above example illustrates that a system can be used with a flowcell (e.g., the flowcell 1700) that includes a first sample surface (e.g., the surface of the substrate 1702 that faces the channel 1706) parallel to a second sample surface (e.g., the surface of the substrate 1704 that faces the channel 1706). A first grating (e.g., the grating 1710) can couple a first portion of first illuminating light (e.g., the light beam 1714) to illuminate the first sample surface. A second grating (e.g., the grating 1716) can couple a second portion of the first illuminating light (e.g., the light beam 1718 when the light beams 1714 and 1718 are from the same light source) to illuminate the second sample surface.

The above example illustrates that a first grating (e.g., the grating 1710) can be offset, relative to the second grating (e.g., the grating 1716), in a travel direction (e.g., the x-direction) of the first portion of the first illuminating light (e.g., the light beam 1714).

The above example illustrates that a system can be used with a flowcell (e.g., the flowcell 1700) and an image sensor, and that an illumination area on the flowcell can be co-registered with a field of view of the image sensor.

Light that exits the flowcell 1700 can be blocked from entering the objective lens or from otherwise reaching the image sensor. In some implementations, a wall 1722 or other barrier can be used. The wall 1722 can be referred to as a beam dump. For example, the wall 1722 can be positioned so as to block the light from the light beam 1714 that the grating 1712 couples out of the planar waveguide of the substrate 1702. For example, the wall 1722 can be positioned so as to block the light from the light beam 1718 that the grating 1720 couples out of the planar waveguide of the substrate 1704. In some implementations, the wall 1722 can be placed at a location after the objective lens in the path of the returning light.

Figure 18:
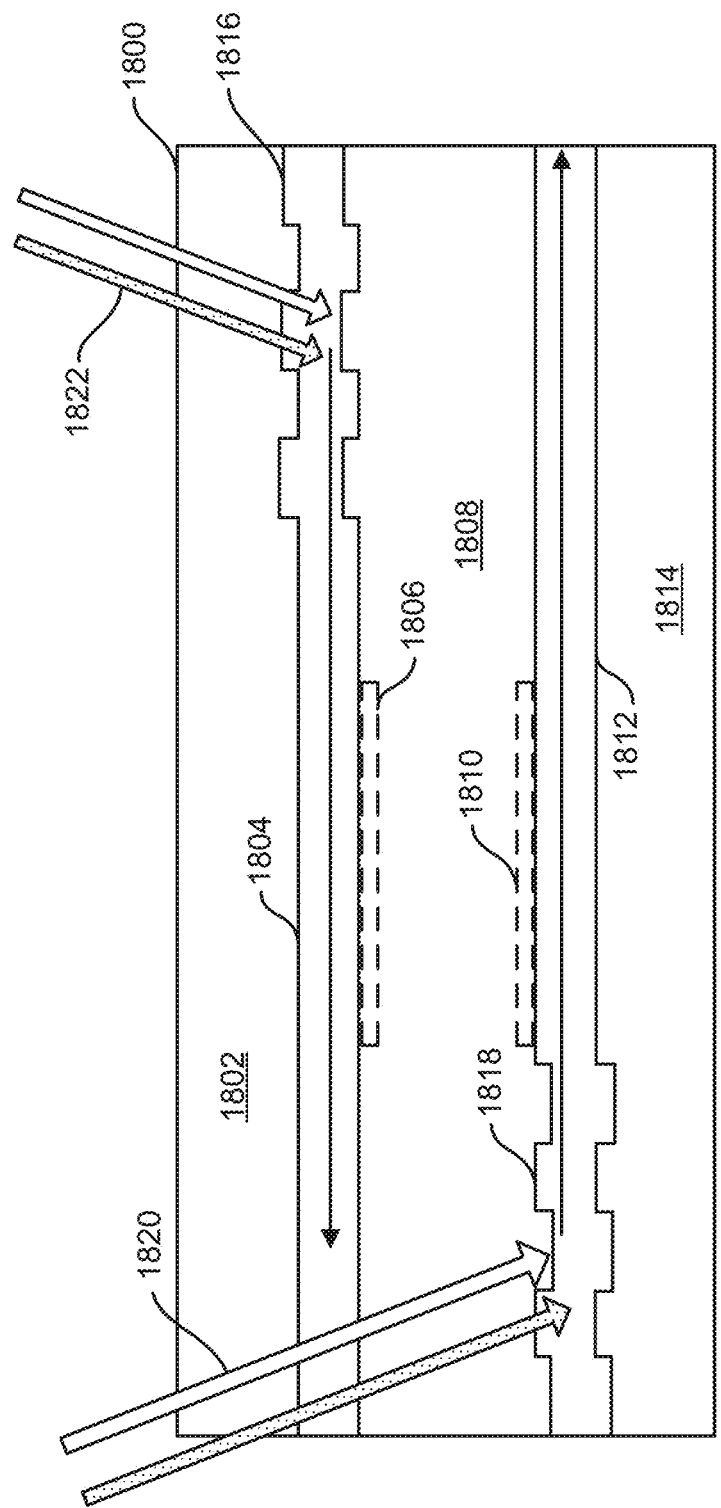
FIGS. 18-19 show other examples of dual surface imaging using a flowcell.
Figure 19:
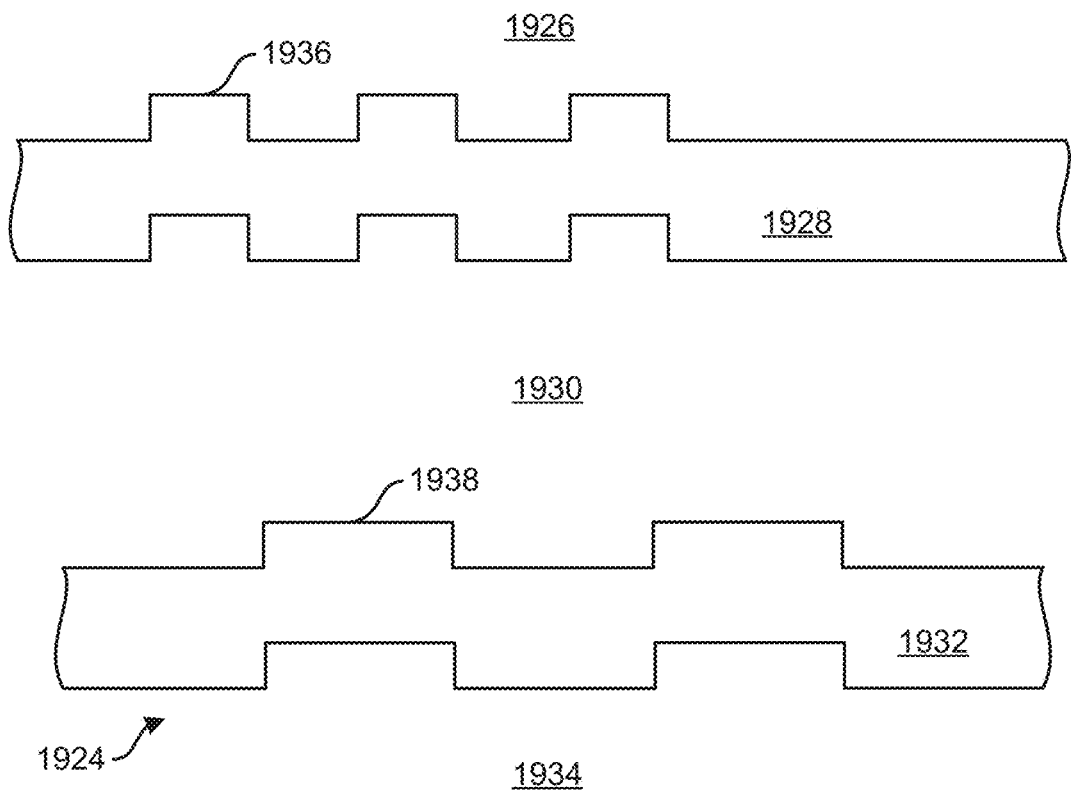

FIGS. 18-19 show other examples of dual surface imaging using a flowcell. In FIG. 18, a flowcell 1800 is shown in cross section. The flowcell 1800 includes a cover glass substrate 1802, a planar waveguide 1804, a sample 1806 on or adjacent the planar waveguide 1804, a water buffer 1808, a sample 1810 on or adjacent a planar waveguide 1812, and a glass substrate 1814. For example, the cover glass substrate 1802 can be a relatively thin piece of transparent material that allows observation of the sample 1806, such as by way of a microscope. In some implementations, the planar waveguide 1804 can be considered a top surface, and the planar waveguide 1812 can be considered a bottom surface.

A grating 1816 is formed in the planar waveguide 1804, and a grating 1818 is formed in the planar waveguide 1812. The gratings 1816 and 1818 can have the same or different grating design as each other.

Illuminating light can be coupled into the planar waveguides 1804 or 1812. Here, light beams 1820 propagate through the cover glass substrate 1802, the planar waveguide 1804 and the water buffer 1808. The light beams 1820 are then coupled into the planar waveguide 1812 by the grating 1818. For example, the light beams 1820 can include one or more laser beams having a 455 nm, 532 nm and/or 660 nm wavelength. Similarly, light beams 1822 propagate through the cover glass substrate 1802 and are coupled into the planar waveguide 1804 by the grating 1816. For example, the light beams 1822 can include one or more laser beams having a 455 nm, 532 nm and/or 660 nm wavelength. One or more lasers can be used to generate the light beam 1820. One or more lasers can be used to generate the light beam 1822.

One or more processes can be performed using the flowcell 1800. In some implementations, a first process involves the top surface (here the surface of the planar waveguide 1804 facing the water buffer 1808) being excited and imaged with the light beams 1822. A second process can involve the bottom surface (here the surface of the planar waveguide 1812 facing the water buffer 1808) being excited and imaged with the light beams 1820. Between such processes, refocusing of an objective lens, and adjustment of coupling angle, can be performed. The sample 1806 (e.g., the top surface) or the sample 1810 (e.g., the bottom surface) can be imaged before the other.

Other gratings (not shown) can be used to couple light out of one or more of the planar waveguides 1804 and 1812. In some implementations, another grating can be placed in the planar waveguide 1804 and/or in the planar waveguide 1812. Such a grating can couple light out of the respective planar waveguide 1804 or 1812. For example, the grating 1816 and such an additional grating can form a pair in parallel on the same surface of the planar waveguide 1804 to define an illumination area for a sensor (e.g., a TDI sensor). For example, the grating 1818 and such an additional grating can form a pair in parallel on the same surface of the planar waveguide 1812 to define an illumination area for a sensor (e.g., a TDI sensor).

Instead of coupling light out of the planar waveguide 1804 or 1812 using an additional grating, another way of dealing with residual light can be used. In some implementations, the light can be blocked directly on the flowcell. For example, a metal strip and/or an absorption strip can be applied to the planar waveguide to block the light after the light has illuminated the samples.

The above example illustrates that a flowcell (e.g., the flowcell 1800) can include a substrate (e.g., the glass substrate 1814) to hold a sample (e.g., the sample 1806 and/or 1810). The flowcell can include a first planar waveguide (e.g., the planar waveguide 1804) to lead first light (e.g., light beams 1822) for the sample. The flowcell can include a first grating (e.g., the grating 1816) to couple the first light. The flowcell can include a second planar waveguide (e.g., the planar waveguide 1812) to lead second light (e.g., the light beams 1820) for the sample. The flowcell can include a second grating (e.g., the grating 1818) to couple the second light.

The above example illustrates that a system can be used with a first planar waveguide (e.g., the planar waveguide 1804) into which a first grating (e.g., the grating 1816) couples a first portion (e.g., the light beams 1822) of first illuminating light, and a second planar waveguide (e.g., the planar waveguide 1812) into which a second grating (e.g., the grating 1818) couples a second portion (e.g., the light beams 1820) of the first illuminating light (when the light beams 1820 and 1822 are generated by the same light source).

The sample 1806 and/or 1810 can generate one or more fluorescence responses based on the illuminating light. For example, the sample 1806 and/or 1810 can include one or more fluorophores that reacts to the illuminating light and generates a response.

FIG. 19 shows a cross section of part of a flowcell 1924. In some implementations, the flowcell 1924 can include a cover glass substrate 1926, a planar waveguide 1928, a water buffer 1930, a planar waveguide 1932, and a glass substrate 1934. A grating 1936 is formed in the planar waveguide 1928, and a grating 1938 is formed in the planar waveguide 1932. The gratings 1936 and 1938 can have different coupling angles. The coupling angle can depend on the grating period, grating depth, and/or the material of the planar waveguide 1904 or 1912. In some implementations, the gratings 1936 and 1938 have different grating periods. For example, the grating 1936 can have a shorter grating period than the grating 1938.

Figure 20:
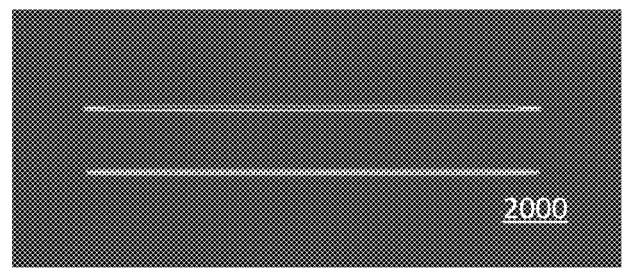
FIG. 20 shows an example image of flowcell illumination.

FIG. 20 shows an example image 2000 of flowcell illumination. In some implementations, the image 2000 can represent an illumination profile on a flowcell, the profile determined by a design model. For example, laser power can be distributed in a linear area, including, but not limited to, in a 1200 μm×20 μm area. For example, a laser power of 4 mW can be used.

Figures 21A, 21B:
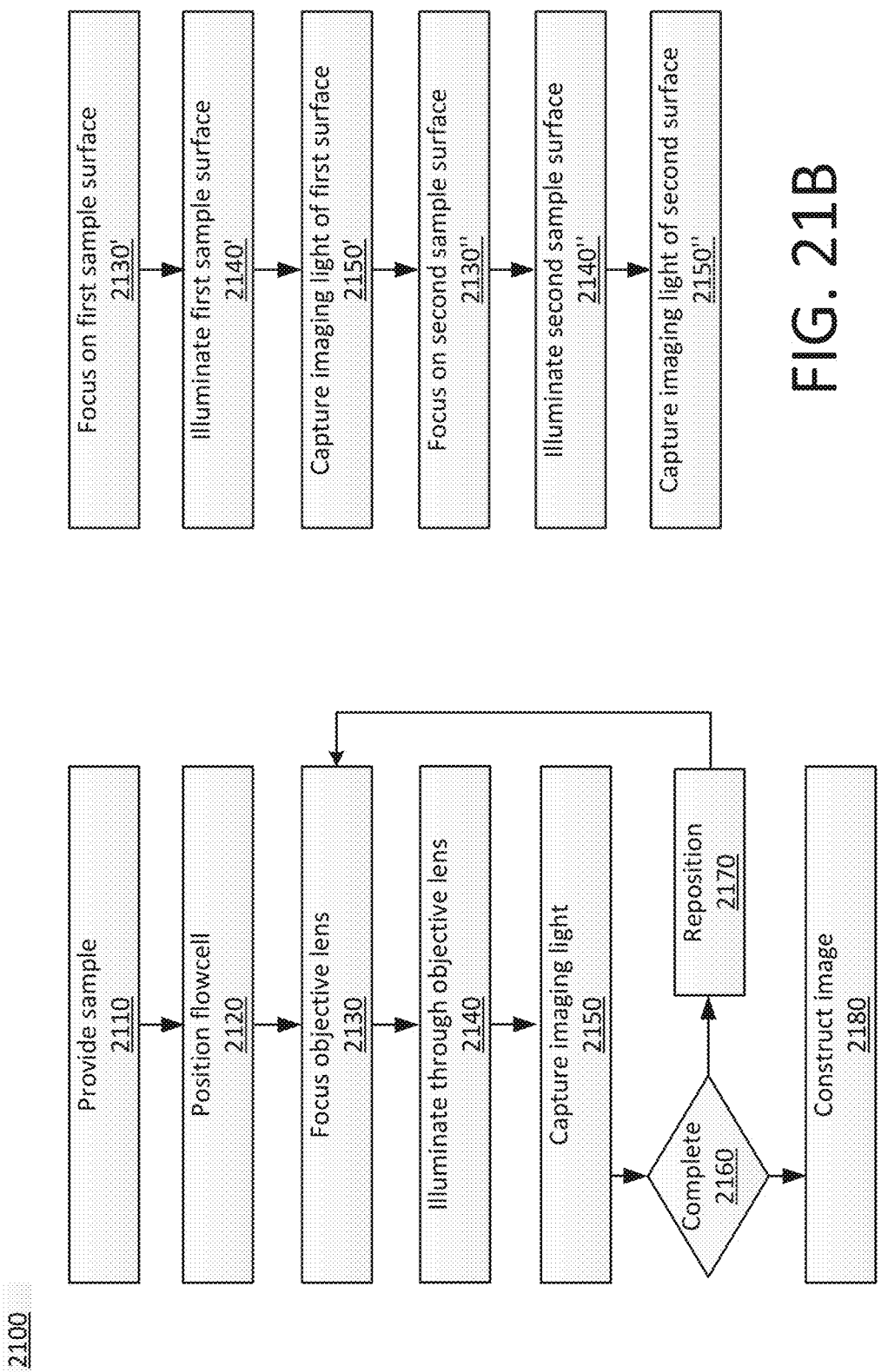
FIGS. 21A-21B show example flowcharts of a process.

FIGS. 21A-21B show example flowcharts of a process 2100. The process 2100 can be performed in one or more systems, including, but not limited to, in a sequencing apparatus. For example, the process 2100 can be performed in any system described herein.

At 2110, at least one sample can be provided. For example, this can include obtaining a sample of genetic material, purifying the sample, modifying the sample, and replicating the sample into clusters. The sample can be provided in a flowcell, including, but not limited to, in any of the flowcells described herein.

At 2120, the flowcell containing the sample can be positioned in a sequencing system. For example, in the system 1600 (FIG. 16), the sample 1624 can be positioned relative to the objective lens 1622 using the stage 1626 and the track 1638.

At 2130, an objective lens can be focused. For example, the objective lens 1622 in FIG. 16 can be focused so that the image sensor 1634 and/or 1636 obtains a clear view of imaging light from the sample 1624.

At 2140, the sample can be illuminated through the objective lens. The illuminating light can be coupled into a planar waveguide by a grating outside of the field of view of the objective lens. This example illustrates that the process 2100 can involve feeding illuminating light through an objective lens and into a flowcell via a grating positioned outside an image-sensor field of view.

At 2150, imaging light can be captured through the objective lens using the image sensor(s).

At 2160, it can be determined if the imaging session is complete. For example, if a scanning process is being performed and the entire sample has not yet been imaged, then the process 2100 can continue to 2170, where a repositioning is performed. The relative position of the sample and the objective lens is altered. For example, the sample 1624 in FIG. 16 can be advanced relative to the objective lens 1622 by the track 1638. The process can then return to 2130 for focusing (if necessary) and thereafter illuminate another area of the sample at 2140, and so on.

If the imagining is complete at 2160, the process 2100 can continue to 2180, where an image can be constructed. For example, an image can be constructed from respective line scans taken by a TDI sensor.

FIG. 21B relates to imaging using multiple surfaces in the flowcell. In some implementations, operations shown in FIG. 21B can be performed instead of 2130-2150 in the process 2100. At 2130', an objective lens can be focused on a first sample surface. For example, this can be the surface of the planar waveguide 2004 in FIG. 18. At 2140', the first sample surface can be illuminated. For example, this can be done using the light beams 2021 in FIG. 18. At 2150', an image of the first sample surface can be captured using the objective lens.

At 2130", an objective lens can be focused on a second sample surface. For example, this can be the surface of the planar waveguide 1812 in FIG. 18. At 2140", the second sample surface can be illuminated. For example, this can be done using the light beams 2020 in FIG. 18. At 2150", an image of the second sample surface can be captured using the objective lens.

The present example illustrates that a method can involve a flowcell that includes a first sample surface parallel to a second sample surface, and such a method can further include directing a first component of the illuminating light (e.g., the light beams 1822) to a first grating (e.g., the grating 1816) aligned with the first sample surface, and directing a second component (e.g., the light beams 1820) of the illuminating light to a second grating (e.g., the grating 1818) aligned with the second sample surface.

The present example illustrates that a method can involve adjusting the objective lens (at 2130') to focus on the first sample surface in connection with directing (at 2140') the first component of the illuminating light to the first grating, and adjusting the objective lens (at 2130") to focus on the second sample surface in connection with directing (at 2140") the second component of the illuminating light to the second grating.

Figure 22:
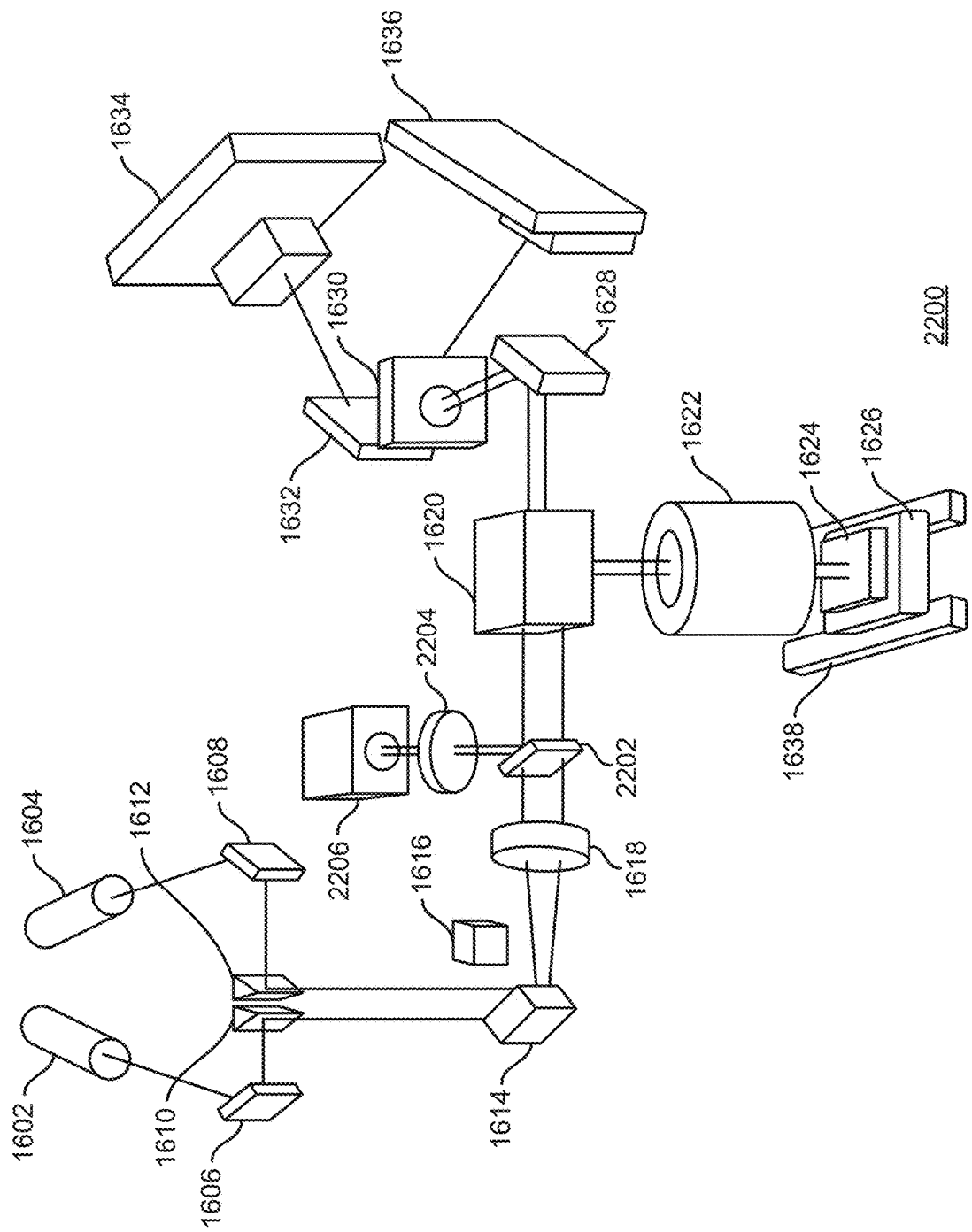
FIG. 22 schematically shows an example of a system for laser illumination and fluorescence imaging.

FIG. 22 schematically shows an example of a system 2200 for laser illumination and fluorescence imaging. The system 2200 is configured to perform auto-alignment for planar waveguide illumination. Some aspects of the system 2200 can be identical or similar to those of the system 1600 (FIG. 16). For example, components 1602-1638 of the system 2200 can be essentially the same components, and/or perform essentially the same functions, as the corresponding components in the system 1600.

As mentioned above with reference to FIG. 16, the objective lens 1622 will direct illuminating light (sometimes referred to as exciting light) to the sample 1624 and receive imaging light from the sample 1624 propagating in essentially the opposite direction toward the component 1620. After passing through the planar waveguide, the exciting light can also enter the objective lens 1622 and propagate toward the component 1620. For example, this situation can occur when the planar waveguide has an exit grating that couples the exciting light out of the flowcell, and no beam dump, etc., is present that could block the exciting light from re-entering the objective lens 1622.

At the component 1620, the imaging light and the returning exciting light can be separated from each other. For example, a dichroic mirror can be used. The imaging light can be directed toward the mirror 1628, ultimately to be received by the image detector(s) 1634-36. The returning exciting light, on the other hand, can be directed toward a beamsplitter 2202. The beamsplitter 2202, which is sometimes referred to as a pickoff mirror, redirects a portion of the returning exciting light arriving from the component 1620 toward a projection lens 2204 positioned before an image sensor 2206. In some implementations, the beamsplitter 2202 has an asymmetrically reflective coating. For example, the respective sides of the beamsplitter 2202 can be coated as dielectric filters.

The image sensor 2206 (e.g., a charge-coupled device) can be configured for capturing an image of the sample 1624 including the gratings thereon, for use in evaluating a quality of the image to be captured by the image detectors 1634-36. For example, if the sample 1624 is not properly oriented relative to the camera plane of the image detectors 1634-36, then the resulting image can have inferior quality. This can be described as there being a residual between a sample plane and the camera plane. The image sensor 2206 can then be used in determining whether the orientation of the laser beams and/or the sample 1624 should be adjusted, including, but not limited to, by way of the process described below. Such an adjustment or correction can be referred to as de-tilting the sample.

The projection lens 2204 can be used to control the image captured by the image sensor 2206. The beamsplitter 2202, moreover, has here been placed between the tube lens 1618 (sometimes referred to as a projection lens) and the component 1620. Such a placement can provide the advantage that the returning exciting light arriving from the component 1620 does not pass through the tube lens 1618 before entering the image sensor 2206. The magnification, etc. of the returning exciting light is therefore not dependent on the magnification chosen for the tube lens 1618.

Figure 23:
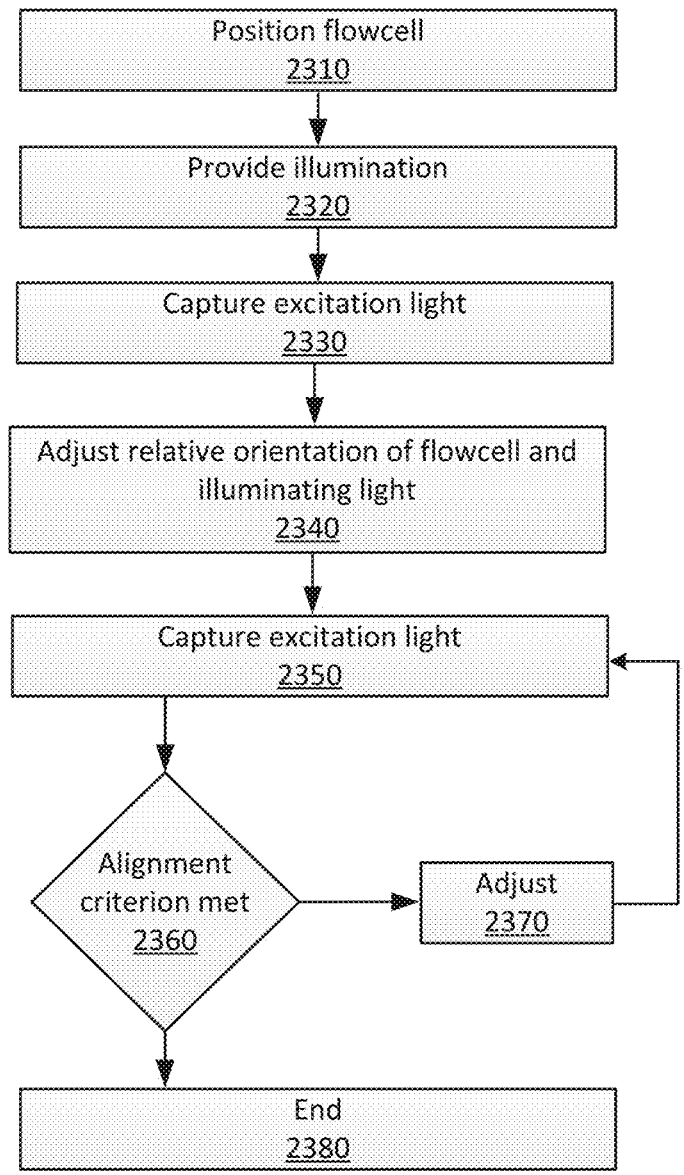
FIG. 23 shows an example flowchart of a process for alignment.

FIG. 23 shows an example flowchart of a process 2300 for alignment. For example, the process 2300 can be performed in a system (e.g., the system 2200) to perform auto-alignment of illuminating light relative to a flowcell for improved image quality. More or fewer operations than shown can be performed. Two or more operations can be performed in a different order.

At 2310, a flowcell can be positioned. For example, in the system 2200, the sample 1624 can be positioned using the stage 1626.

At 2320, illumination can be provided. For example, in the system 2200 one or more laser beams from the lasers 1602 and/or 1604 can be directed through the objective lens 1622 and at the sample 1624.

At 2330, excitation light can be captured. The image sensor 2206 in the system 2200 can receive light from the beamsplitter 2202 that passes through the projection lens 2204. In some implementations, the image captured by the image sensor 2206 can be equivalent to the image of the planar waveguide 400 in FIG. 4, which image has a sufficiently large field of view that the gratings 402 and 404 are visible. As described with reference to FIG. 4, the area 406 corresponds to the reflection of the laser beam impinging on the grating 402. The area 410, moreover, corresponds to the laser beam of the line 408 exiting the grating 404.

The amount of light visible in the areas 406 and/or 410 can be an indication of alignment quality. If the area 406 is relatively bright this can be an indication that a significant portion of the impinging laser beam is being reflected (i.e., not coupled) by the grating 402. For example, this can be an indication that the impinging laser beam does not have the correct coupling angle and that an adjustment should be done. If the area 410 is relatively dim, or dark, this indicates that light is not being coupled into the planar waveguide 400 at the grating 402. Similarly, this can be an indication that the impinging laser beam does not have the correct coupling angle and that an adjustment should be done.

At 2340, an adjustment of the relative orientation of the flowcell and the illuminating light can be performed. In the system 2200, the orientation of the laser beam(s) can be controlled by adjusting one or more of the lasers 1602 or 1604, the mirrors 1606 or 1608, the prisms 1610 or 1612, the mirror 1516, the component 1620, and/or the objective lens 1622. In the system 2200, the orientation of the sample 1624 can be adjusted using the stage 1626. In some implementations, the stage 1626 can be adjusted in multiple degrees of freedom. For example, three tilt motors can be used for exact (e.g., with nanometer precision or greater) positioning of the sample 1624. The adjustment of relative orientation at 2340 can affect the quality of coupling of the impinging laser beam into the planar waveguide.

At 2350, excitation light can be captured. In some implementations, this can be done to evaluate whether the coupling of light into the planar waveguide 400 (FIG. 4) has improved compared to before the adjustment at 2340 was made. In some implementations, if the area 406 has become dimmer (e.g., having less intensity) in the excitation light captured at 2350 than in the excitation light captured at 2330, this can be an indication of improved alignment. In some implementations, if the area 410 has become brighter (e.g., having more intensity) in the excitation light captured at 2350 than in the excitation light captured at 2330, this can be an indication of improved alignment. For example, if the area 406 has become dimmer and the area 410 has become brighter, this can be a particularly significant indication of improved alignment. As such, one or more alignment criteria can be applied to the captured excitation light.

The capturing of the excitation light can occur at separate moments, as indicated by the operations 2330 and 2350, or it can be done continuously, for example in form of a live feed of the image of the flowcell.

At 2360, it can be determined whether the at least one alignment criterion has been met. If so, the process 2300 can continue to 2380. For example, the self-alignment can end at 2380.

If the alignment criterion has not been met at 2360, the process 2300 can continue with one or more iterations. For example, one or more adjustments can be performed at 2370 in analogy with the adjustment done at 2340. The process 2300 can then continue to 2350, where excitation can be captured for renewed analysis, and so on. The process 2300 can continue iterating until the alignment criterion is met at 2360 or another termination occurs.

Figure 24:
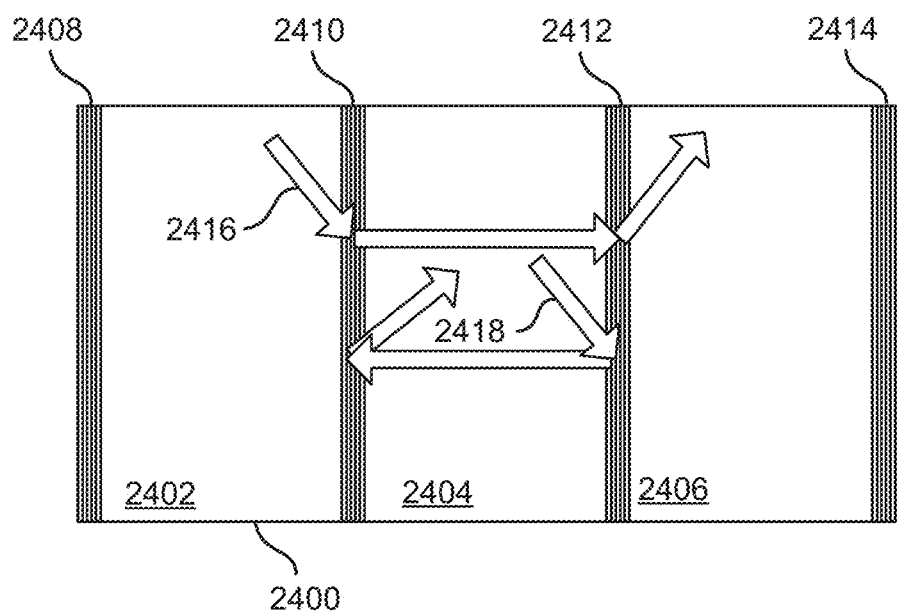
FIG. 24 shows an example of a flowcell with multiple swaths.

FIG. 24 shows an example of a flowcell 2400 with multiple swaths 2402, 2404 and 2406. The swaths 2402-06 correspond to the areas where samples (e.g., clusters of genetic material) are present, which samples should be illuminated in an imaging process. The flowcell 2400 includes gratings 2408, 2410, 2412 and 2414. Here, the gratings 2408 and 2410 serve as boundaries for the swath 2402; the gratings 2410 and 2412 serve as boundaries for the swath 2404; and the gratings 2412 and 2414 serve as boundaries for the swath 2406. For example, each of the swaths 2402-06 can have one or more respective planar waveguides that allow light to enter at one of the adjacent gratings, travel through the planar waveguide, and exit at the opposite grating. As such, the swaths 2402-06 and the gratings 2408-14 can be placed on the flowcell 2400 to provide a large imaging area that is compatible with the field of view of the image sensor (e.g., a TDI sensor). Such a design can save flowcell area and thereby reduce a consumable cost.

A grating can serve as both an input grating and an exit grating. For example, a light beam 2416 is here incident on the flowcell 2400 at the grating 2410. The light beam 2416 here has the proper coupling angle for the grating 2410 and is therefore coupled into the planar waveguide of the swath 2404. The grating 2412 on the other side of the swath 2404 couples the light beam 2416 out of the flowcell 2400. As such, for the light beam 2416, the grating 2410 can be considered the entry grating and the grating 2412 can be considered the exit grating.

As another example, a light beam 2418 is here incident on the flowcell 2400 at the grating 2412. The light beam 2418 here has the proper coupling angle for the grating 2412 and is therefore coupled into the planar waveguide of the swath 2404. The grating 2410 on the other side of the swath 2404 couples the light beam 2418 out of the flowcell 2400. As such, for the light beam 2418, the grating 2412 can be considered the entry grating and the grating 2410 can be considered the exit grating. An imaging process can involve illuminating respective portions of the swaths 2402-06 using corresponding ones of the gratings 2408-16, and capturing the imaging light accordingly, and then moving the flowcell 2400 to instead illuminate another portions of the swaths 2402-06 using corresponding ones of the gratings 2408-16, and capturing that imaging light accordingly.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A flowcell comprising:
   a first substrate that includes a first sample surface, and a second substrate that includes a second sample surface, the first sample surface facing the second sample surface;
   a first grating to couple first illuminating light into the first substrate to illuminate the first sample surface; and
   a second grating to couple second illuminating light into the second substrate to illuminate the second sample surface.

2. The flowcell of claim 1, wherein the first grating is positioned on a first planar waveguide, and wherein the second grating is positioned on a second planar waveguide.

3. The flowcell of claim 2, the first grating to couple the first illuminating light into the first planar waveguide, and the second grating to couple the second illuminating light into the second planar waveguide.

4. The flowcell of claim 3, wherein the first grating is offset, relative to the second grating, in a travel direction of the first illuminating light.

5. The flowcell of claim 3, further comprising a third grating to couple the first illuminating light out of the first planar waveguide, and a fourth grating to couple the second illuminating light out of the second planar waveguide.

6. The flowcell of claim 5, wherein the first grating is offset, relative to the second grating, in a travel direction of the first illuminating light.

7. The flowcell of claim 6, wherein the third grating is offset, relative to the fourth grating, in a travel direction of the second illuminating light.

8. The flowcell of claim 7, wherein the first grating is positioned after the second grating in the travel direction of the first illuminating light, and wherein the third grating is positioned after the fourth grating in the travel direction of the second illuminating light.

9. The flowcell of claim 6, wherein the first and second gratings have different coupling angles.

10. The flowcell of claim 2, the first illuminating light to propagate through the second planar waveguide before being coupled by the first grating.

11. The flowcell of claim 2, the second illuminating light not propagating through the first planar waveguide before being coupled by the second grating.

12. The flowcell of claim 11, the first illuminating light propagating through the second planar waveguide before being coupled by the first grating.

13. The flowcell of claim 1, wherein the first and second gratings have different coupling angles.

14. The flowcell of claim 13, wherein the first and second gratings have different grating periods.

15. The flowcell of claim 1, wherein the first grating is offset, relative to the second grating, in a travel direction of the first illuminating light.

16. The flowcell of claim 15, wherein the first and second gratings have different coupling angles.

17. The flowcell of claim 1, wherein the substrate comprises (i) a first substrate including the first sample surface and (ii) a second substrate including the second sample surface, the flowcell further comprising a channel between the first and second sample surfaces.

18. The flowcell of claim 17, the first illuminating light to propagate through the channel before being coupled by the first grating.

19. A flowcell comprising:
a first substrate that includes a first sample surface, and a second substrate that includes a second sample surface, the first sample surface facing the second sample surface;
first means for coupling first illuminating light into the first substrate to illuminate the first sample surface; and
second means for coupling second illuminating light into the second substrate to illuminate the second sample surface.

20. The flowcell of claim 19, wherein the first means couples the first illuminating light into a first planar waveguide of the flowcell, wherein the first means is further for coupling the first illuminating light out of the first planar waveguide, wherein the second means couples the second illuminating light into a second planar waveguide of the flowcell, and wherein the second means is further for coupling the second illuminating light out of the second planar waveguide.

* * * * *